(12) United States Patent
Karkos, Jr. et al.

(10) Patent No.: US 6,793,167 B2
(45) Date of Patent: *Sep. 21, 2004

(54) FOOD PROCESSING APPARATUS INCLUDING MAGNETIC DRIVE

(75) Inventors: John F. Karkos, Jr., Libson Falls, ME (US); Ron Flanary, Blacksburg, VA (US)

(73) Assignee: Island Oasis Cocktail Company, Inc., Walpole, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/292,406

(22) Filed: Nov. 12, 2002

(65) Prior Publication Data

US 2003/0197080 A1 Oct. 23, 2003

Related U.S. Application Data

(63) Continuation-in-part of application No. 09/981,062, filed on Oct. 16, 2001, now abandoned, which is a continuation of application No. 09/481,482, filed on Jan. 11, 2000, now Pat. No. 6,336,603, which is a continuation-in-part of application No. 09/473,311, filed on Dec. 28, 1999, now Pat. No. 6,210,033, which is a continuation of application No. 09/228,377, filed on Jan. 12, 1999, now Pat. No. 6,095,677.

(51) Int. Cl.[7] .............................................. B01F 13/08
(52) U.S. Cl. ................................ 241/101.2; 241/282.1; 366/274
(58) Field of Search ........................ 241/101.2, 101.8, 241/282.1; 310/103; 366/274

(56) References Cited

U.S. PATENT DOCUMENTS

| | | | |
|---|---|---|---|
| 1,242,493 | A | 10/1917 | Stringham |
| 1,420,773 | A | 6/1922 | Stainbrock |
| 1,420,774 | A | 6/1922 | Stainbrock |
| 2,350,534 | A | 6/1944 | Rosinger |
| 2,356,784 | A | 8/1944 | Graham |
| 2,459,224 | A | 1/1949 | Hendricks |
| 2,466,468 | A | 4/1949 | Neal |
| 2,549,121 | A | 4/1951 | Osterheld |
| 2,566,743 | A | 9/1951 | Okulitch et al. |
| 2,655,011 | A | 10/1953 | Ihle et al. |
| 2,828,950 | A | 4/1958 | Stilwell |
| 2,951,689 | A | 9/1960 | Asp et al. |
| 3,113,228 | A | 12/1963 | Tolegian |
| 3,140,079 | A | 7/1964 | Baermann |

(List continued on next page.)

FOREIGN PATENT DOCUMENTS

| | | |
|---|---|---|
| DE | 1131 372 | 6/1962 |
| EP | 0 491 424 | 6/1992 |
| GB | 622115 | 5/1949 |
| JP | 60-34727 | 2/1985 |
| WO | WO 98/12795 | 3/1998 |

*Primary Examiner*—Lowell A. Larson
(74) *Attorney, Agent, or Firm*—Foley Hoag LLP

(57) ABSTRACT

Food processing apparati including magnetic drives are described herein. According to one exemplary embodiment, a food processing apparatus may include a motor having a motor shaft, a rotor rotatably mounted on the motor shaft, and a stator producing an electromagnetic field for interacting with the rotor. The rotor may include a rotor magnet having an inner rotor magnet surface facing toward the motor shaft, and the stator may include an outer stator surface facing away from the motor shaft. The inner rotor magnet surface may at least partially face the outer stator surface.

28 Claims, 15 Drawing Sheets

U.S. PATENT DOCUMENTS

| | | | |
|---|---|---|---|
| 3,279,765 A | 10/1966 | Sato et al. |
| 3,304,990 A | 2/1967 | Ontko et al. |
| 3,554,497 A | 1/1971 | Zipperer |
| 3,680,984 A | 8/1972 | Young et al |
| 3,694,341 A | 9/1972 | Luck, Jr. |
| 3,920,163 A | 11/1975 | Brown |
| 4,199,265 A | 4/1980 | Sanderson et al. |
| 4,226,669 A | 10/1980 | Vilardi |
| 4,568,195 A | 2/1986 | Herz et al. |
| 4,752,138 A | 6/1988 | Rufer |
| 4,780,637 A | 10/1988 | Wolcott |
| 4,803,390 A | 2/1989 | Bertram et al. |
| 4,836,826 A | 6/1989 | Carter |
| 4,913,555 A | 4/1990 | Maeda et al. |
| 4,991,973 A | 2/1991 | Maaz et al. |
| 4,993,840 A | 2/1991 | Maeda et al. |
| 5,149,998 A | 9/1992 | Wolcott |
| 5,334,898 A | 8/1994 | Skybyk |
| 5,470,152 A | 11/1995 | Rains |
| 5,478,149 A | 12/1995 | Quigg |
| 5,495,221 A | 2/1996 | Post |
| 5,529,391 A | 6/1996 | Kingman et al. |
| 5,642,009 A | 6/1997 | McCleer et al. |
| 5,656,880 A | 8/1997 | Clark |
| 5,684,712 A | 11/1997 | Goffe et al. |
| 6,095,677 A | 8/2000 | Karkos, Jr. et al. |
| 6,210,033 B1 | 4/2001 | Karkos, Jr. et al. |
| 6,336,603 B1 | 1/2002 | Karkos, Jr. et al. |

FOOD PROCESSING APPARATUS INCLUDING MAGNETIC DRIVE

REFERENCE TO RELATED APPLICATIONS

This application is a continuation-in-part of U.S. patent application Ser. No. 09/981,062, filed Oct. 16, 2001, now abandoned, which is a continuation of U.S. patent application Ser. No. 09/481,482, filed Jan. 11, 2000, now U.S. Pat. No. 6,336,603, which is a continuation-in-part of U.S. patent application Ser. No. 09/473,311, filed Dec. 28, 1999, now U.S. Pat. No. 6,210,033, which is a continuation of U.S. patent application Ser. No. 09/228,377, filed Jan. 12, 1999, now U.S. Pat. No. 6,095,677. All of these applications and issued patents are expressly incorporated by reference herein.

BACKGROUND OF THE INVENTION

This invention relates to a magnetic drive to transmit rotational motion from a motive source into an enclosed space without a direct mechanical connection. More specifically, it relates to blenders, mixers, and like machines, and particularly to devices having a stirrer, impeller, blade, or other tool mounted within a removable cup or container, and rotated by means of a motor located in the stationary base of the machine.

Conventional home blenders and mixers incorporate a mechanically-driven impeller rotatably mounted within a removable blender cup. The base of the cup incorporates a generally circular connection plate with a pattern of projections and/or depressions formed on its lower face that is removably mateable, using a vertical, drop-in movement, with a corresponding pattern formed on a like plate attached to the shaft of a motor housed in a base of the machine. This mechanical coupling between the blender cup and the blender motor requires a rotary seal at the base of the cup between the impeller and connecting plate. This seal is subject to considerable wear and tear over time, as is the mechanical coupling. Because seal failure can result in liquid leaking out of the cup, the seal and bearings in the base of the cup are built to ensure sealing at the expense of friction. The friction produces wear, heat, and loss of power. Moreover, the conventional blender produces much unwanted noise, and the mechanical interlocking coupling between the plates can make it awkward or difficult to remove the cup from, and return the cup to, the base.

Many drink mixers have the drive motor mounted in the base directly under the cup. If overall height is a concern, however, the motor may be positioned off to the side and coupled to the driving shaft by a belt or gear arrangement.

Known home and commercial blenders use conventional a.c. motors. While a.c. motors can be constructed and controlled to provide speed variation, as well as the requisite output torque, a typical such motor is generally bulky, heavy, and not well-suited to electronic speed control, let alone electronic braking.

While d.c. brushless motors are also known per se, they have not been used for blenders or blender/shavers. These motors use a comparatively heavy rotor formed of a sector-like array of permanent magnets. Blending of a mass of shaved or cubed ice and liquid, particularly on start up or during a "freeze up" of a frozen drink, requires a comparatively high torque. D.C. brushless motors are characterized by a low output torque as compared to conventional a.c. motors. They therefore have found use as a motive power source mainly in applications such as fans where a low output torque is acceptable.

A commercially viable blender/shaver for the production of frozen drinks must satisfy a variety of special and important design criteria. It should be compact, both in its footprint and overall height, so as to utilize limited space at a bar efficiently. It ideally has a comparatively low weight. The straight-forward approach of placing a conventional electric motor directly under the blender cup increases the overall height of the machine, and therefore is not typically used. There must also be speed control, typically provided through gearing and electronics, to accommodate different power and speed requirements in different phases of operation. Rapid controlled braking is also important to limit the overall time required to blend, to avoid splashing of the blended material after blending is complete, and for safety. Control of vibration, prevention of overheating, or minimization of wear, ease of maintenance, and durability are also important.

It has also been known that an impeller within a blender cup may be driven magnetically or electromagnetically rather than mechanically. One type of magnetic drive couples a rotating permanent magnet outside a blender cup or the like, to another permanent magnet rotatably mounted in the blender cup. U.S. Pat. No. 2,459,224 to Hendricks; U.S. Pat. No. 2,655,011 to The et al.; and U.S. Pat. No. 5,478,149 to Quigg are exemplary of this approach. Hendricks discloses a magnetically operated stirrer for mixing liquids, in which the stirrer has a magnet mounted at its lower end and within the container for the liquid. Quigg discloses a motor that drives a set of magnets,.via gear box and shaft, to couple to another set of magnets mounted on an agitator.

U.S. Pat. No. 3,140,079 to Baermnann uses a large rotating plate to carry a series of circumferentially spaced magnets that pass under one portion of a much smaller, rotatable conductive disc.

U.S. Pat. No. 1,242,493 to Stringham and U.S. Pat. No. 1,420,773 to Stainbrook disclose electrical drink mixers in which a stator of an a.c. motor surrounds and interacts with a rotor in a blender cup, or in its base. In Stringham, a squirrel cage rotor lies in the plane of the stator windings. In Stainbrook an a.c. rotor is mounted in the base of the blender cup and stator coils are located below the cup. Such split a.c. motor arrangements are limited by the torque, speed control, eddy current loss, and emf interference problems of a.c. motors, as accentuated by the physical separation of the stator windings and the rotor. They do not provide good speed control. They do not utilize a d.c. magnetic field coupling. And the inclusion of the rotor of the motor within the container or cup adds unwanted weight to the cup assembly and makes the cup difficult to handle due to gyroscopic effects if it is picked up while the rotor is still spinning.

If the rotor of a brushless d.c. motor were to be located in the base of a blender cup, the cup would not only become heavy and exhibit a severe gyroscopic effect, but it would also "stick" to metal sinks and countertops, and would attract loose metallic implements such as silverware, barware, or coins.

It is therefore a principal object of this invention to provide a drive system that provides reliable, speed-controlled rotary power transmission to a rotatable driven element that is sealed from the source of motive power.

Another aspect is to provide a drive that is automatically clutched to disconnect the drive when the load exceeds a preset value or the driven member is moved from its operating position.

A further object is to provide a magnetic drive offering these advantages, in which the driver element is located in a removable blender cup and the blender cup is easy to insert and remove from the blender and is easy to handle when removed from the blender, e.g., it exhibits no significant gyroscopic effect or magnetic attraction.

Yet another object is to provide a low wear, low maintenance, non-mechanical coupling between motor and drive element, and in particular, one which avoids the high maintenance costs associated with present belt drives and mechanical clutches and brakes.

A still further object is to provide a magnetic drive for a blender or the like with the foregoing advantages which is compact, low in weight, and very easy to use and clean.

Another object is to provide a drive whose operating characteristics can be programmed and which can be braked rapidly and reliably.

SUMMARY OF THE INVENTION

In its preferred application as a drive for a blender or other food processing apparatus, the present invention employs an electric motor to rotate a ring magnet, preferably an assembly of two ring magnets with axial poles, that is closely spaced from a disc-shaped drive plate formed of a conductive, magnetizable material. The magnet assembly and drive plate each have matching, circumferentially-arrayed poles. The magnet assembly preferably has a set of an even number of generally pie-shaped, permanent magnet poles or segments of alternating polarity. The drive plate is preferably a thin sheet of a ferrous material such as cold-rolled steel with open-ended radial slots that define the poles and control eddy currents. The magnet assembly produces a sufficiently strong field (flux lines) that despite the spacing, which typically includes high reluctance air gaps, nevertheless induces oppositely polarizing magnetization of the disc poles. This induced magnetization couples the magnet assembly to the plate in order to drive it. In a blender, the drive plate is rotatably mounted in the base of the blender cup and supports a shaft that in turn mounts an impeller. The magnet assembly and the motor are separately housed from the drive plate.

The electric motor is preferably a brushless d.c. motor with stator windings that produce a rotating electromagnetic field that interacts with, and produce a torque on, a rotor that includes a magnet assembly like the one magnetically coupled to the disc. The rotor magnet ring is preferably secured to the drive magnet ring by bonding these magnet rings to opposite faces of a circular cold-rolled steel disc. The rotor, drive magnet ring and drive plate are co-axially aligned when the plate and its associated apparatus, such as a blending cup, are in an operating position. The motor and drive housing preferably has a flat upper wall that extends continuously through the magnet-to-plate gap, as does a flat bottom wall on the blender cup. For a magnet assembly with a field strength on its surface of 1400 gauss, the close spacing for a blender application is preferably about 0.25 inch. Use of a comparatively flat d.c. brushless motor mounted under the driven member gives the motor part of the drive a compact configuration, preferably with a height-to-width ratio of as little as about 1:3.

Viewed broadly as a method, the invention includes the steps of rotating a rotor magnet with multiple circumferentially-spaced poles by interacting the poles with a rotating electromagnetic field. The rotor is in turn coupled to a second drive magnet with a like number of circumferentially-arrayed poles mechanically coupled to rotate in unison with the rotor. The method further includes the steps of directing the magnetic field of the drive magnet axially away from the rotor to induce oppositely polarized magnetic poles in a conductive drive plate that is rotatably mounted, and closely-spacing the drive magnet from the plate so that the induced poles in the plate follow the poles in the rotating magnet assembly despite the spacing and despite a load that resists rotation. The directing of the magnetic field includes bonding the magnets in a sandwich fashion to opposite faces of a thin steel disc and polarizing the ring magnets axially.

In accordance with another aspect of the present invention, the drive of the present invention can include a gear assembly having one or more gears for transmitting torque from the drive plate to a driven member such as, for example, an output shaft. The gear assembly can include one or more gears sized and arranged to reduce, or to increase, the torque transmitted from the drive plate to the driven member. In a preferred application, the drive and gear assembly are employed to rotate the blade of an ice shaver. The ice shaver can be a stand alone unit or can be incorporated with a blender, such as the blender of the present invention, to form an automatic blender/ice shaver machine for manufacturing frozen drinks.

BRIEF DESCRIPTION OF THE DRAWINGS

These and other features and objects of the invention will be more fully understood from the following detailed description that should be read in light of the accompanying drawings. In the accompanying drawings, like reference numerals refer to like parts throughout the different views. While the drawings illustrate principles of the invention disclosed herein, they are not drawn to scale, but show only relative dimensions.

DETAILED DESCRIPTION OF THE INVENTION

Figure 1:
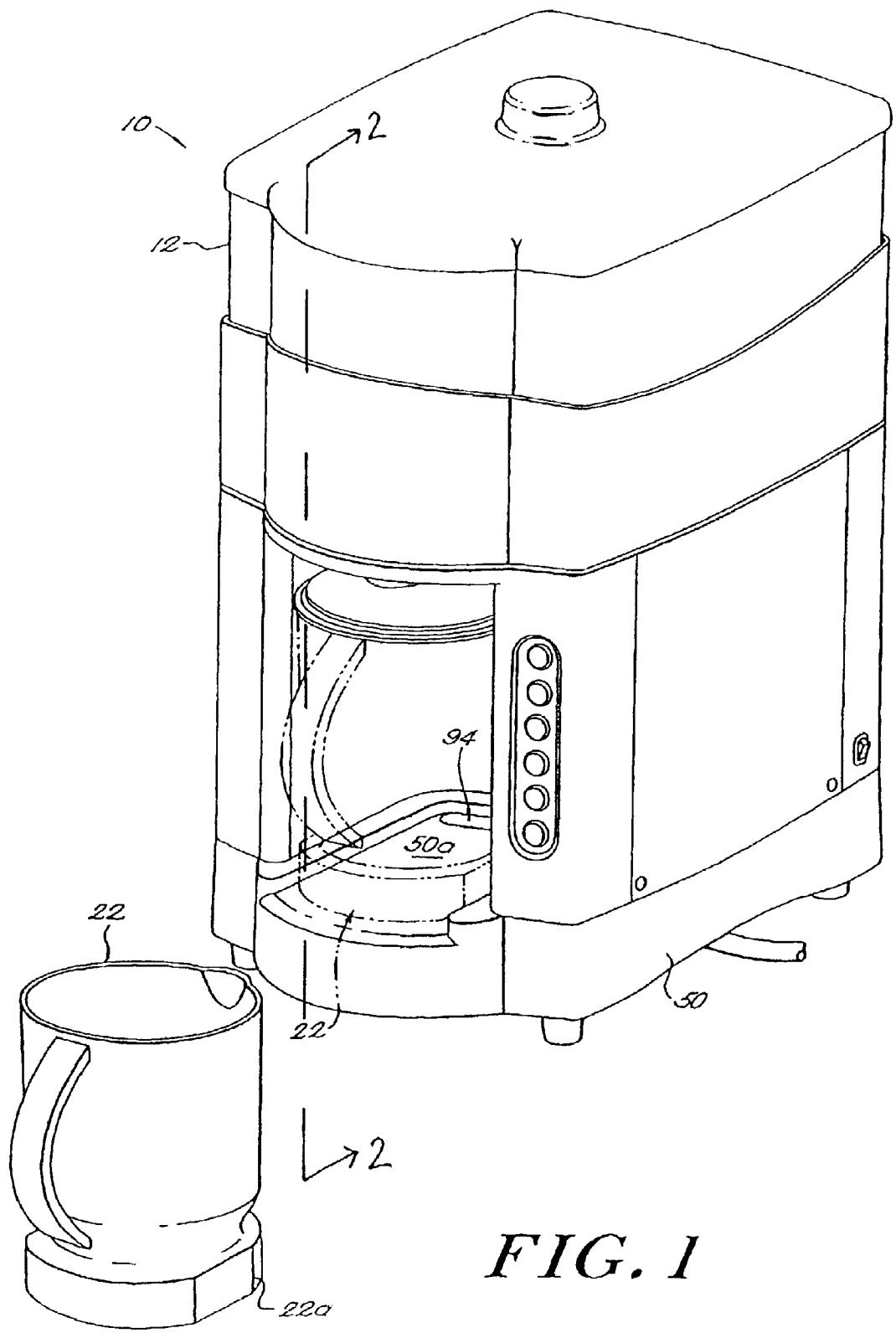
FIG. 1 is a view in perspective of a blender/shaver machine constructed according to the present invention.

Certain exemplary embodiments will now be described to provide an overall understanding of the principles of the food processing apparati and magnetic drives disclosed herein. One or more examples of these embodiments are illustrated in the drawings. Those of ordinary skill in the art will understand that the food processing apparati and magnetic drives disclosed herein can be adapted and modified to provide instruments and methods for other applications and that other additions and modifications can be made without departing from the scope of the present disclosure. For example, the features illustrated or described as part of one embodiment or one drawing can be used on another embodiment or another drawing to yield yet another embodiment. Such modifications and variations are intended to be included within the scope of the present disclosure.

Figure 2:
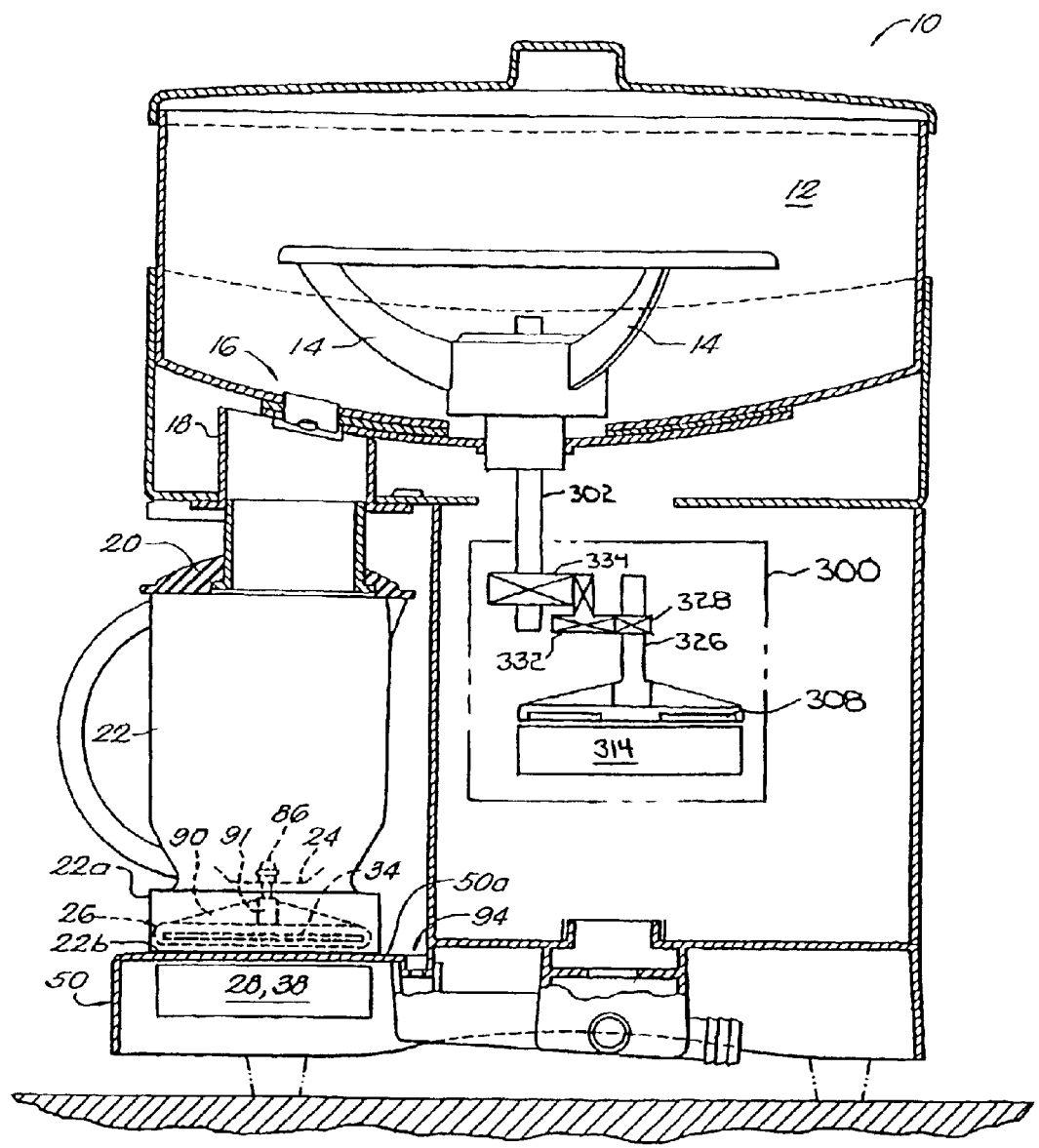
FIG. 2 is a view in vertical section of the blender/shaver machine of FIG. 1.

FIGS. 1 and 2 show a principal application of the present invention, namely, in a blender/shaver machine 10 adapted to the automatic manufacture of frozen drinks in bars and restaurants. A supply of ice in a hopper 12 is fed by a rotating set of blades 14 to a blade 16. The shaved ice falls through a chute 18 including a lid 20 into a blender cup 22 to which liquid ingredients such as a flavor concentrate and/or spirit have been added. Rotation of an impeller (or blade set) 24 at the bottom of the cup for a preset period of time produces a high quality frozen drink—one that peaks when poured and has a generally uniform, non-marbled, non-watery consistency. While the invention will be described below principally with reference to use in the blender/shaver 20, it will be understood that the invention can be used in a wide variety of applications where it is desired to transmit power from a rotary output of a motive source (e.g., a motor) to a driven member under a load, particularly a rotating driven member held in a container that is sealed from and removable from the motive source. The invention can be used, for example, in a variety of food processing equipment such as home blenders, food mixers, food processors and juicers.

Figure 3:
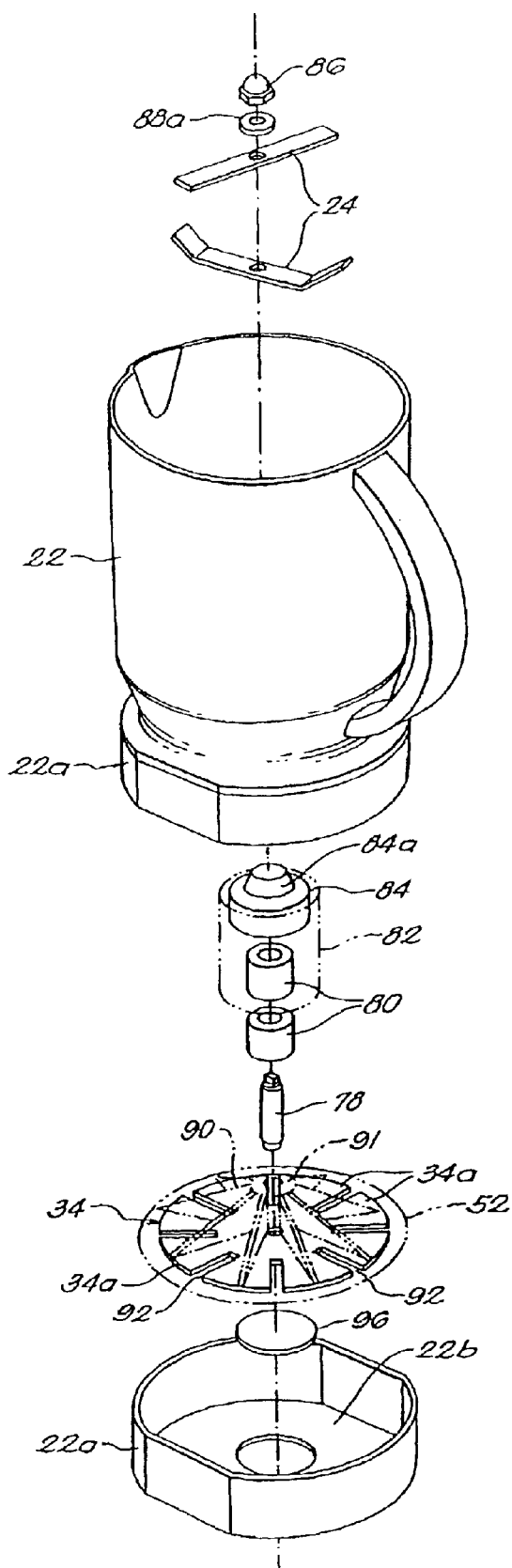
FIG. 3 is an exploded perspective view of the blender cup shown in FIGS. 1 and 2.
Figure 4:
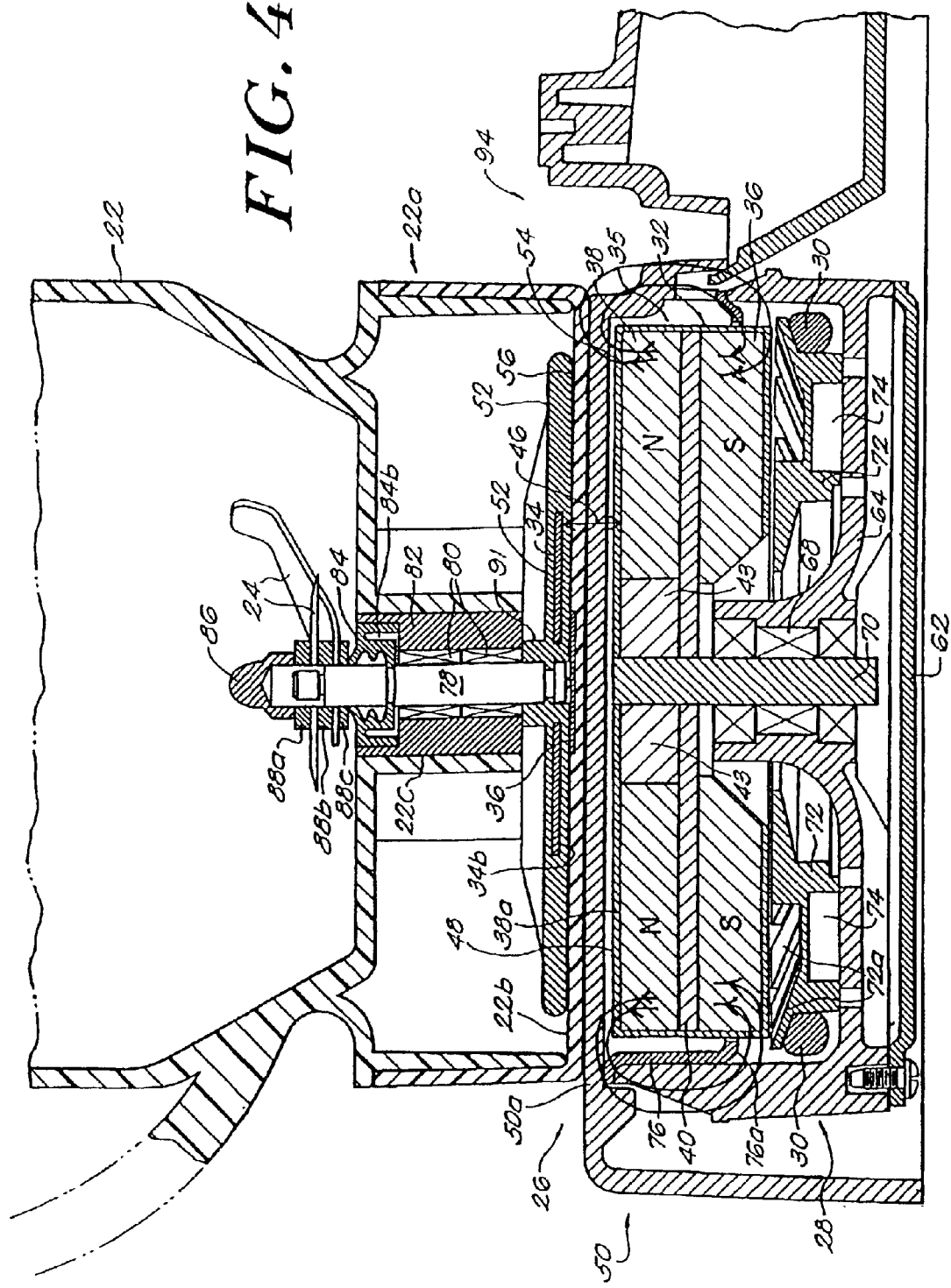
FIG. 4 is a detailed view in vertical section of the magnetic drive of the present invention as shown in FIG. 2 used to power an impeller mounted in the base of a blender cup.
Figure 5:
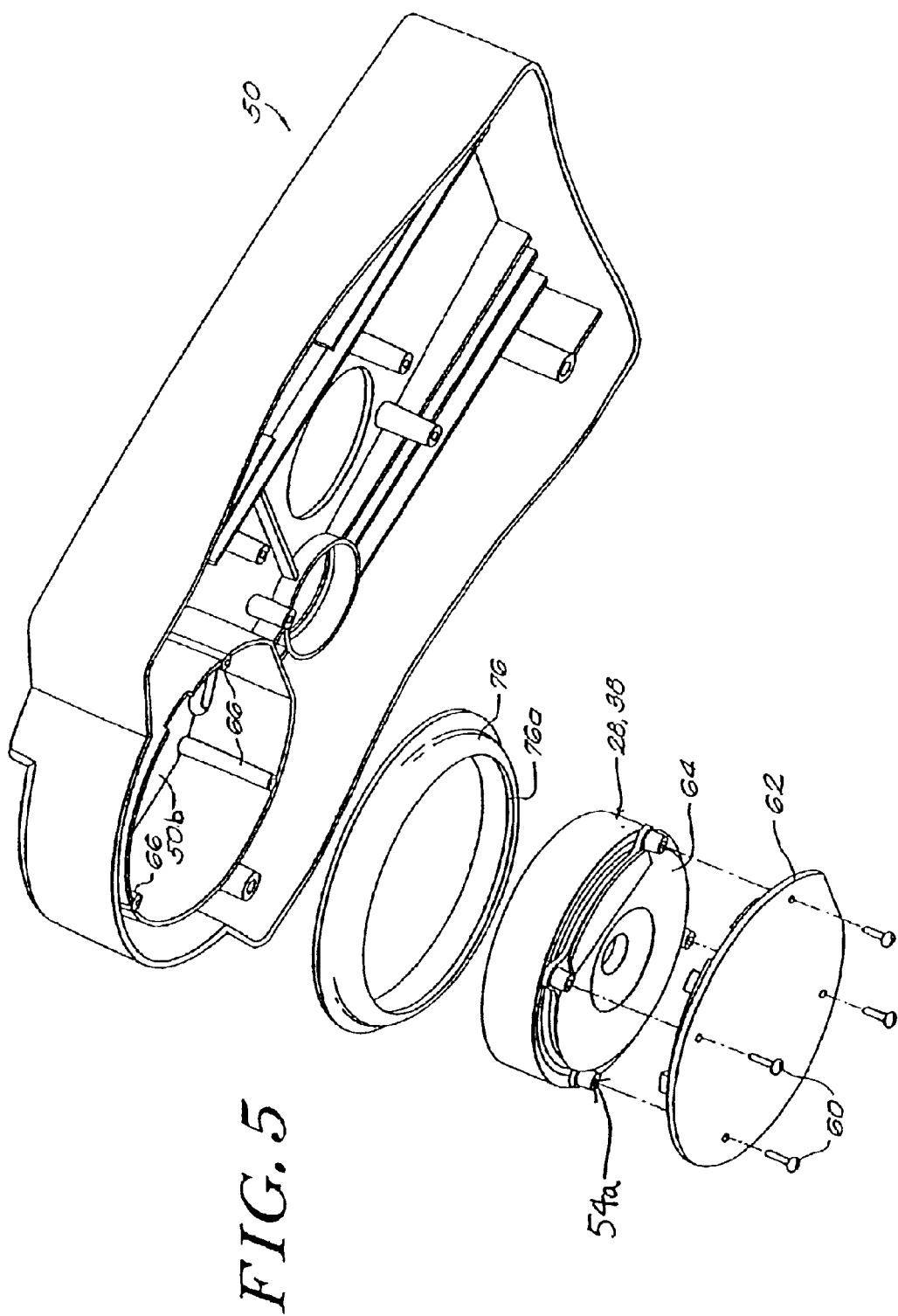
FIG. 5 is an exploded perspective view of the base of the blender/shaver shown in FIGS. 1 and 2 showing the mounting of the motor assembly for the magnetic drive according to the present invention.

A magnetic drive 26 for the impeller 24 is the focus of the present invention. With reference to FIGS. 3–5, the drive 26 includes a generally circular drive plate 34 rotatably mounted in the base 22a of the blender cup 22 and a brushless d.c. motor 28 including stator coils 30 and a rotor 32. The rotor in turn includes a double magnet assembly 35 preferably formed of a rotor ring magnet 36, a drive ring magnet 38 and a disc 40 of a magnetizable material, preferably cold-rolled steel, bonded between the magnets 36 and 38.

Figure 6:
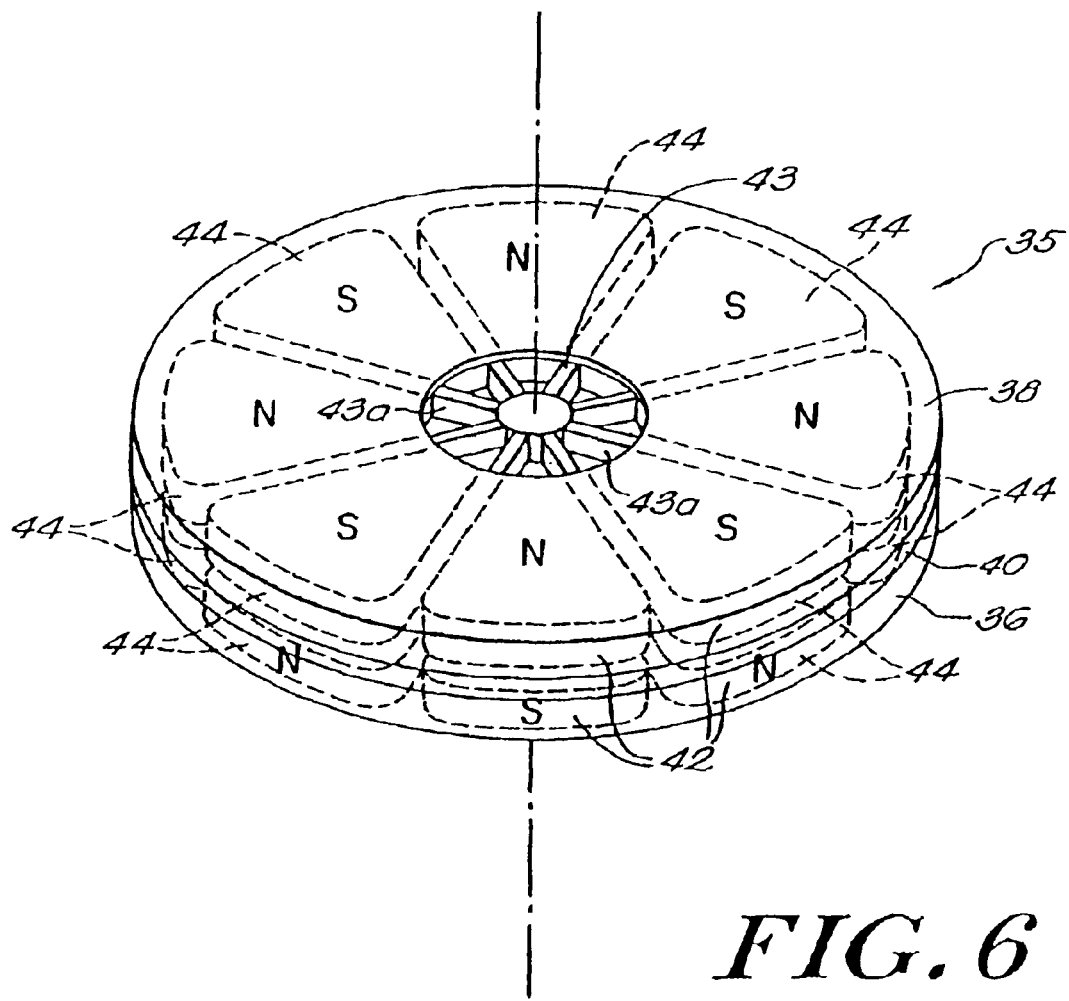
FIG. 6 is a view in perspective of the double magnet assembly shown in FIG. 4.

The ring magnets 36 and 38 each have multiple circumferentially-arrayed, axially-directed poles 42, eight as shown in FIG. 6. Laterally adjacent segments have the opposite polarity. While eight poles are preferred, any even number can be used. Preferably each pole 42 is developed by a generally pie-shaped permanent magnet region 44 formed in a continuous ring of a strongly magnetic material such as the ceramic magnets sold by Hitachi Corporation. The magnet regions 44 in each magnet 36 and 38 can also be separate pieces bonded or otherwise mechanically secured to one another to form a ring assembly with flat faces and a generally cylindrical outer wall. A plastic hub 43 with radially directed support walls 43a fills the center of the magnets 36, 38 to facilitate mounting the assemblies on a central shaft. A north pole magnet region 44 is adjacent a south pole magnet region 44. Assemblies 36 and 38 are then affixed to the disc 40, preferably with each permanent magnet region 44 in one assembly overlying a like magnet region in the other assembly, but having the opposite polarity to avoid the repulsive magnetic force between the magnets 36 and 38. A plastic overlayer 48 helps to secure the sandwich assembly. This magnet assembly configuration with axially oriented magnetic pole regions 44, and the low reluctance return path presented by the steel disc 40 for all of the magnet regions 44, directs the magnetic field (lines of flux) of the rotor-magnet 36 axially (downwardly as shown) toward the stator coils 30 and the magnetic field of the drive magnet 38 axially (upwardly as shown) toward the plate 34 in the cup base 22a. The strength and this axial directing of the field of the drive magnet 38 induce magnetic fields of opposite polarity in a corresponding poles 24a formed in the drive plate 34 despite the presence of a spacing 46, albeit a close spacing, between the generally flat upper surface 38a of the magnet assembly and the generally flat lower surface 34b of the plate 34.

In the preferred form illustrated and shown for the blender/shaver (used to blend up to 80 fluid ounces of a frozen drink), the permanent magnet 36 develops a magnet field strength of about 1400 gauss at its surface, and the spacing 46 is about 0.25 inch measured axially. This spacing includes, as shown in FIG. 4, not only four layers 48, 50a, 52, 22b of what is typically a plastic material, but also air gaps 54 and 56. Layers 48 and 52 are a thin plastic over-molding for the magnet assembly 35 and the drive plate 34, respectively. The layer 50a is the flat upper wall portion of a base 50 of the blender/shaver 10. Layer 22b is the flat lower wall of the cup base 22a.

The air gap 54 is a slight clearance between the rotor over-molding 48 and the wall 50a. The gap 56 is a slight clearance between the wall 22b and the drive plate over-molding 52. As will be readily appreciated by those skilled in the art, this spacing is a significant source of reluctance in the magnet circuit between the ring drive magnet 38 and the plate 34. Permanent magnet rotors of known d.c. brushless motors, e.g., the 5 inch disc-diameter motor sold by Integrated Motion Controls, LLC of Torrington, Conn. under its Model No. 50, while roughly comparable in size, construction and field strength to the magnet 38, cannot couple to the plate 34 across the spacing 46 with sufficient strength to drive the disc operating a blender/shaver.

With particular reference to FIGS. 4 and 5, the motor 28 is mounted in the base 50 by screws 60 that pass through a steel motor cover 62 and a rear stator support 64 into threaded sockets 66 formed in a motor mount wall 50b of the base. The rear stator support 64 has a central opening that holds a bearing assembly 68 that journals a motor shaft 70. Screws (not shown) passing through openings 54a in the rear stator support thread into and secure a front stator support 72 to sandwich a ring 74 of back steel in the assembly adjacent the coils 30. The front stator support 72 has a periphery 72a that is sloped and slotted to carry the stator windings 30 as in the aforementioned Model 50 motor. (The portions of the windings in the slots are not shown for clarity.) The windings are three phase, being energized by a conventional brushless d.c. motor drive circuit to produce a rotating electromagnetic field. The base and stator supports are preferably formed of a moldable, high-strength plastic, and with a wall thickness, that rigidly supports the motor 28.

The double magnet assembly 35 with the shaft 70 secured at its center slides axially into the bearing 68 (FIG. 4). The assembly 35 rotates in the bearing 68 with a clearance on all sides of the assembly 35. As noted above, the multi-pole, d.c. magnetic field produced principally by the lower (as shown) rotor magnet 36 is directed principally downwardly to interact with the rotating electromagnetic field produced by the stator coils 30 when they are energized. Rotation of this electromagnetic field interacting with the rotor magnet assembly produces a torque that rotates the rotor at a like rotational speed. The disc 40 bonded between the magnets 36 and 38 transmits this torque to the plate drive magnet 38. As a safety precaution against combustion should the coils 30 overheat, a ring-like shroud 76 has a lower flange 76a that extends substantially across the air gap between the outer edge of the assembly 35 and the generally cylindrical inner side wall of the rear stator support 64 (with a slight clearance to avoid frictional contact with the magnet assembly 35). The shroud fills this gap sufficiently to impede an air flow that would otherwise feed oxygen to a fire.

The magnet assembly 35 in a five-inch diameter weighs approximately three pounds. With typical operating speeds varying from 4,000 to 10,000 rpm, it can exert significant forces on the mounting structures, particularly rapidly varying forces that produce vibrations. The mounting structure is made sufficiently rigid, through choice and dimensions of materials as well as the overall design, e.g., the use of wall reinforcements such as exterior ribs, to resist the forces and moments produced in normal operation, and thereby to control vibrations that would otherwise loosen, wear and the extreme, eventually destroy the motor.

Position of the rotor is sensed by three conventional Hall effect sensors mounted in a known manner in the motor housing, or the base 50. Position signals provide input to a known electronic control and drive circuit that energizes the three phase stator windings 30 to produce (i) a start-up torque, (ii) a ramp up of the rotor speed of rotation to a selected operating speed, (iii) a maintained rotation at that selected speed under load, and then (iv) a rapid and reliable braking. Operating of the motor is thus electronically controlled and programmable Braking is electronic—with the braking currents induced in the windings 30 being dissipated in large resistors or FET's mounted on heat sinks.

With reference to FIGS. 2–4, and especially FIGS. 3 and 4, the conductive drive plate 34 is non-rotatably secured to the lower end of a shaft 78 that is journalled in a stacked pair of needle bearing assemblies 80. A surrounding brass-collar 82 press fit into a central, cylindrical-walled opening 22c in the plastic base 22a holds the bearing assemblies 80. At the bottom of the cup, the collar 82 has an enlarged diameter counter bore that receives and secures a rotary seal 84 formed of a suitably elastomeric material such as a wear-resistant rubber. The seal has three inwardly facing, mutually-spaced lips 84a whose inner edges each engage, and provide a low-friction running or sliding seal around the shaft 78. The seal 84 retains liquid in the cup 22 despite the presence of a rotating shaft penetrating the bottom wall of the cup. The lower-most lip 84a engages the shaft 78 in a circumferential groove that locates and stabilizes the seal. A deep circular groove 84b in the lower face of the seal allows the lips to flex resiliently, yet lightly, against the shaft. Above the seal, an acorn nut 86 threaded on the upper end of the shaft 78 secures the blades 24 sandwiched between three washers 88a, 88b, and 88c.

The drive plate 34 is part of a drive plate assembly that includes a set of vertical, radially-arrayed, reinforcing ribs 90 angularly centered over each pole 34a (FIG. 3). The ribs 90 and a central boss 91 that surrounds the shaft 78 are preferably molded continuously with the bottom layer 52. The plate 34 is preferably formed of a thin sheet of a ferrous material such as cold-rolled steel, e.g., 0.058 inch thick, with a set of open-ended radial slots 92 that produce the poles 34a. The slots 92 also control eddy currents induced in the plate by the rotating field of the drive magnet assembly 38. Because the plate 34 is thin and slotted, it can deform when it is subjected to the significant attractive magnetic force of the plate drive magnet assembly 38, e.g., typically about five pounds, and be placed in frictional contact with the cup base 22b. The ribs 90 and the over molding generally help the plate to retain its flat configuration.

As shown, the attractive magnetic force acting on the drive plate 34 is preferably carried at a single, central pivot point formed by a hemispherical ball-bearing projecting from the bottom surface of the drive assembly and a stainless steel plate 96 mounted flush with the upper surface of the cup base wall 22b. This arrangement resists the magnet forces pulling down on the plate 34 while at the same time facilitating a low-friction, low-wear rotation of the shaft 78.

Figure 7:
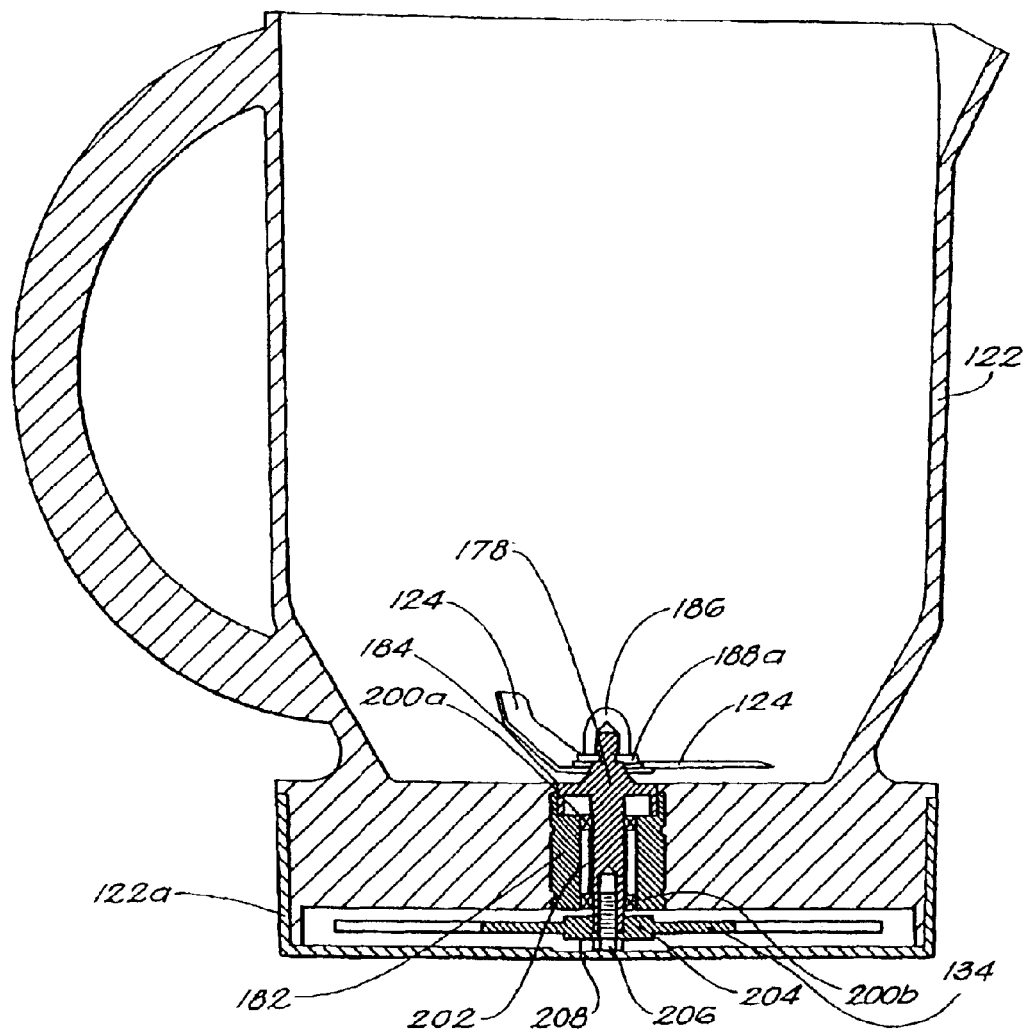
FIG. 7 is a view in vertical section of an alternative embodiment of the blender cup of the present invention.

With reference to FIG. 7, in an alternative embodiment of the blender cup 122, the shaft 178 is rotatably supported by two axially spaced needle bearings 200a and 200b. A cylindrical spacer 202 is interposed between the needle bearings 200a and 200b and surrounds the shaft 178. The drive plate 134 is attached to the shaft 178 through a screw 206 having external threads for mating with complementary internal threads formed in the shaft 178. A flange 204 can be provided at the end of the shaft 178 and the drive plate 134 is sandwiched between the flange 204 and a washer 208 adjacent the head of screw 206. This particular arrangement allows the shaft 178 to be rotatably supported by the needle bearings 200a and 200b and the screw 206 without the need for the hemispherical ball-bearing projecting from the bottom surface of the drive assembly and the stainless steel plate 96 mounted within the cup base wall. It should be understood that the component parts of the embodiment of FIG. 7 are similar to those previously described herein, and accordingly the same reference numerals are used to designate similar parts although the numerals are incrementally increased by 100 to differentiate the embodiments described herein.

It has been found that the coupling, or "traction", between the magnet 38 and the drive plate 34 increases not only as a function of the strength of the magnetic field acting on the poles 34a and the closeness of the magnet-to-disc spacing, but also as a function of the thinness of the plate 34 and the width of the slots 92. In general, the thinner the plate and the wider the slots, the more traction is produced for a given magnet and spacing. The presently preferred slot width for an eight-pole, 4.425 inches diameter plate is about 0.245 inch.

The desired level of traction depends on each application. It is selected to reliably couple the drive plate to the drive magnet when (i) the impellers 24 are started under the load of the shaved ice and liquid ingredients of a frozen drink in the blender cup, (ii) during a ramp up of the operating speed to a selected operating speed, typically thousands of rpm, and then (iii) as the impeller, and the slushy mass in the cup and interacting with the impeller, is brought to a stop. However, the traction is also selected to disconnect, and thereby automatically clutch, the drive 26 when the cup 22 is removed from its operating position on the base wall 50a under the ice chute 18, or when the load exceeds a preset maximum value. This latter situation can arise, for example, when the frozen drink "freezes up" in the cup, that is, becomes partially or totally a solid frozen mass, or when an object inadvertently falls into the blender as it is operating, e.g., a spoon, jewelry, or bottle cap. By de-coupling, the magnetic drive 26 automatically and immediately cuts off power to the impellers to avoid or minimize injury to person(s) near the blender and to the machine itself. This feature also avoids the cost of providing and maintaining a mechanical clutch.

While brushless d.c. motors are known as having comparatively low torque outputs, the present invention has been found to overcome this deficiency. However, to optimize the performance of the motor 28, the stator coils 30 are preferably wound to optimize the torque output at a preselected operating speed, e.g., near 8,000 rpm.

It is significant to note that the drive plate assembly, mainly a thin metal disc and plastic molding over it, are light and non-magnetic. There is little detectable gyroscopic effect when the cup is removed from the blender/shaver after use. There is a low rotational momentum due to the impellers and drive plate assembly. Because the cup is lightweight and nonmagnetic, it is easy to handle.

It is also quite significant that the magnetic drive 26 of the present invention allows the cup 22 to be placed in an operating position on the blender/shaver 10 with a simple, lateral sliding movement over the smooth, flat cup base 22b over the smooth, flat base portion 50a. There is no need to drop the cup vertically onto a mechanically interlocking drive coupling, and then vertically lift the cup off this coupling. The lateral sliding insertion and removal movements are not only more convenient, but they also reduce the vertical clearance required above the cup. This slide-in arrangement also facilitates cleaning the blender base—one need only wipe a smooth surface. Spilled liquid and slush can flow or be pushed over the surface to a drain 94 formed in the base at the rear of the wall 50a. In the event of a safety hazard, blender overload, or any unusual situation requiring a rapid removal of the cup, it is simply and rapidly withdrawn from the machine with a sliding motion. Further, and quite importantly, if an operator is impatient and removes the cup before the motor has fully stopped, a common problem in actual use in a bar, the process of removal itself automatically disconnects the impeller drive from the motor 28 (a misalignment and/or lifting of the cup moves the poles 34a out of a coupled relationship with the magnetic lines of force produced by the magnet assembly 38.) In conventional belt driven, mechanically-clutched blender/shavers, such a premature removal causes stress and wear on the drive train and the clutch.

A further significant advantage of this drive is that it places the motor directly under the blender, thus eliminating drive belts or chains and pulleys or sprockets, but does so while still maintaining vertical, as well as horizontal compactness, both in terms of the height of the motor itself, the vertical height of the coupling between the motor and the cup, and the vertical clearance needed to maneuver the cup onto and off the coupling.

While this invention has been described with respect to its preferred embodiment, it will be understood that various modifications and variations will occur to those skilled in the art. For example, while this invention has been described as powered by a d.c. brushless motor, it is possible to achieve some of the advantages of this invention by using an a.c. motor whose output shaft is coupled to the plate drive magnet. While a rotating magnet assembly has been described as the member coupling to the plate in the cup base, it is possible to produce a rotating electromagnetic or magnetic field using an assembly of electromagnets or other permanent magnet arrangements such as a single, one-piece permanent magnet magnetically configured, or acting in combination with ferromagnetic materials, to produce the desired array of magnetic poles. While the invention has been described with reference to a plate rotatable in the base of a blender cup, the driven element could assume a wide variety of other forms, and need not even be a liquid-holding vessel. While the magnets and plate have been described as having the same number of poles, as is well known, this is not essential to the operating of this invention. A variety of mounting and rotational support arrangements are possible for both the double magnet assembly 35 and the driven conductive plate 34. Further, while a radially slotted plate 34 has been described as forming the poles 34a and controlling eddy currents in the plate, one skilled in the art will readily see that a variety of other known arrangements for forming poles and controlling eddy currents are possible. Still further, while the magnets have been described as bonded to a metal disc, it is not necessary to use this disc.

Figure 8:
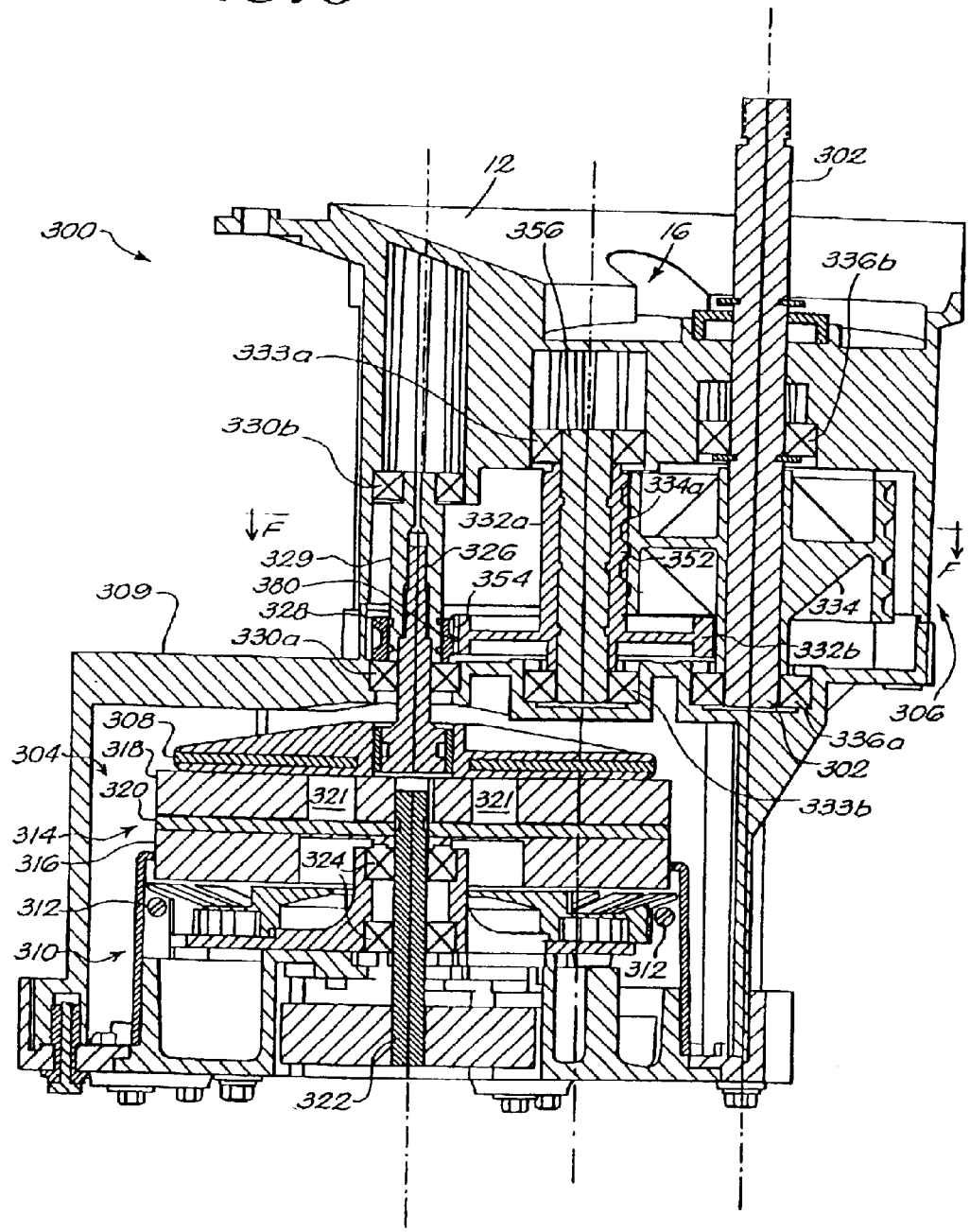
FIG. 8 is a view in vertical section of the magnetic drive and gear assembly for the ice shaver portion of the blender/shaver of the present invention.
Figure 9:
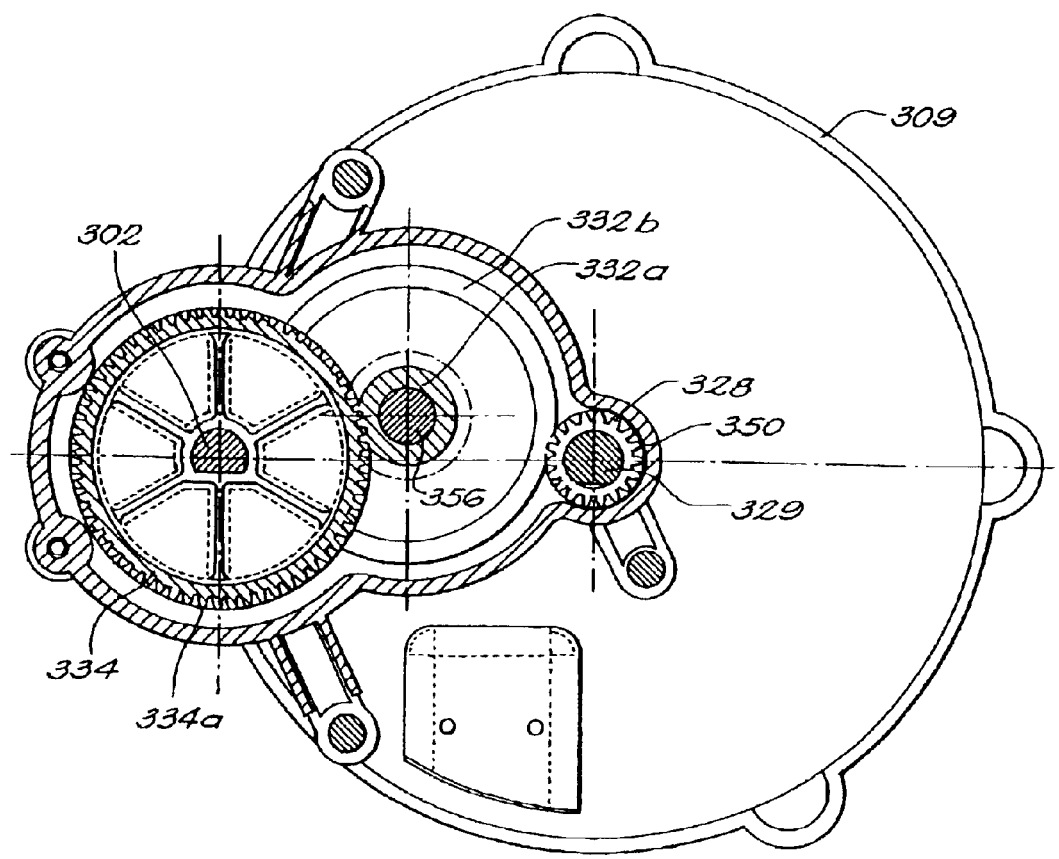
FIG. 9 is a view in vertical cross-section along line F—F of FIG. 8 of the magnetic drive and gear assembly of FIG. 8.

FIGS. 2, 8, and 9 illustrate a further application of the present invention, namely, in an ice shaver assembly for supplying shaved ice to the blender of the blender/shaver machine 10. The ice shaver assembly includes a magnetic drive and gear assembly 300 that operates to rotate blades 14 to supply shaved ice to the blender cup 22 through chute 16. The magnetic drive and gear assembly 300 is coupled to an output shaft 302 that is connected at its upper end to the rotating set of blades 14. The magnetic drive and gear assembly 300 includes a magnetic drive 304 that is analogous in structure and operation to the magnetic drive 26 of the blender. The output of the magnetic drive is transmitted through a gear assembly 306 to the output shaft 302 of the shaver. The gear assembly includes three gears, namely, a motor gear 328, a compound idler gear 332, and an output gear 334.

The magnetic drive 304 for the shaver includes a generally circular drive plate 308 rotatably mounted in the motor housing 309 of the ice shaver assembly and a brushless d.c. motor 310 including stator coils 312 and rotor 314. The rotor 314 in turn includes a double magnetic assembly preferably formed of a rotor ring magnetic 316, a drive ring magnetic 318, and a disk 320 of a magnetizable material, preferably cold-rolled steel, bonded between the magnets 316 and 318.

The ring magnets 316 and 318 each have multiple circumferentially-arrayed, axially-directed poles, as in the case of the ring magnets 36 and 38 of the magnetic drive of the blender described above. The ring magnets 316 and 318, thus, have poles constructed and arranged in a manner analogous to the ring magnets 36 and 38 of the magnetic drive of the blender. A plastic hub 321 fills the center of the ring magnets 316 and 318 to facilitate mounting the magnets on a central shaft 322. The ring magnets are affixed to the disk 320, preferably with each pole in one ring magnet overlying a pole of the other ring magnet having the opposite polarity to avoid the repulsive magnetic force between the magnets 316 and 318. A plastic overlayer enclosing the magnets 316 and 318 and the disk 320 can help secure the magnet assembly.

The brushless d.c. motor 310 is mounted in the motor housing 309 beneath the rotor 314. The motor 310 is constructed and operates in a manner analogous to the motor 28 of the magnetic drive 26 of the blender described above. The stator coils 312 are three phase coils being energized by a conventional brushless d.c. motor drive circuit to produce a rotating electromagnetic field. The rotor 314 with the shaft 322 secured at its center slides axially into a bearing 324.

The rotor 314 rotates in the bearing 324 with clearance on all sides of the rotor 314. The d.c. magnetic field produced principally by the lower rotor ring magnet 316 is directed principally downward to interact with the rotating electromagnetic field produced by the stator coils 30 when the coils are energized. Rotation of this electromagnetic field interacting the rotor magnetic assembly 314 produces a torque that rotates the rotor at a like rotational speed. The disk 320 bonded between the magnets 316 and 318 transmits this torque to the drive ring magnet 318.

As in the case of the rotor 32 of the magnetic drive 26 of the blender, described above, the position of the motor 314 can be sensed by three conventional Hall effect sensors mounted in the motor housing 309. Position signals provide input to an electronic control and drive circuit that energizes the three phase stator windings 312 to produce a startup torque, a rampup of the rotor speed of rotation to a selected operating speed, a maintained rotation at that selected speed under load, and a rapid and reliable braking torque. As in the case of the motor 28 described above, operation of the motor 310 thus can be electronic and programmable. Braking is electronic—with braking currents induced in the windings 312 being dissipated in large resistors or FET's mounted on heat sinks.

The drive plate 308 can be structured in a manner analogous to the drive plate 34 of the magnetic drive 26 of the blender described above. The drive plate 308 is nonrotatably secured to the lower end of a drive shaft 326. The motor gear 328 is non-rotatably attached to a motor gear shaft 329 which in turn is attached to the upper end of the drive shaft 326. The motor gear 328 is preferably a helical gear having a plurality of helical gear teeth 350. The drive shaft 326 axially fits within the gear shaft 329 and is non-rotably secured to the gear shaft 329 and the gear 328 to permit the drive shaft 326 and the gear 328 to rotate in unison. Thus, rotational torque from the drive plate 308 can be transmitted to the gear 328 through the drive shaft 326. The drive shaft 326 and the gear shaft 329 of the motor gear 328 are rotatably supported by a pair of journal bearings 330a and 330a.

The compound idler gear 332 is mechanically coupled to the motor gear 328 and the output gear 334 to transmit rotational torque from the motor gear 328 to the output gear 334. The idler gear 332 includes an elongated, cylindrically-shaped upper gear portion 332a having a plurality of helical gear teeth 352 and a generally disk-shaped lower gear portion 332b. The lower gear portion 332b is provided with a plurality of helical gear teeth 354 complementary in size and shape to the gear teeth 350 of the motor gear 328. The gear teeth 350 of the motor gear 328 engage the gear teeth 354 of the lower gear portion 332b to transmit rotational motion and torque from the motor gear 328 to the idler gear 332. The compound idler gear 332 is nonrotatably secured to a gear shaft 356 which is rotatably supported by a pair of journal bearings 333a and 333b.

The output gear 334 is generally cylindrical in shape and is non-rotatably attached to the output shaft 302 to rotate with the output shaft 302. In particular, the output gear 334 is axially disposed over the output shaft 302 such that the output shaft is fitted within the central opening of the output gear 334. The output gear 334 is provided with a plurality of helical gear teeth 334a complementary in size and shape to the gear teeth 352 of the upper gear portion 332a of the idler gear 332. The gear teeth 352 of the upper gear portion 332a engage the gear teeth 334a of the output gear 334 to transmit rotational motion and torque from the idler gear 332 to the output gear 334. The output shaft 302 and the output gear 334 are rotatably supported by a pair of journal bearings 336a and 336b.

The rotor gear 328, the idler gear 332, and the output gear 334 are preferably helical gears, having helically oriented gear teeth, constructed of light weight, high strength plastic material, such as acetyl or nylon. One skilled in the art will recognize, however, that other gear types, such as spur gears, worn gears or combinations thereof, and other materials, such as metals or composites can be used in the gear assembly 306 of the present invention.

The gear ratio of the gear assembly 306 of the present invention can be adjusted to increase or to decrease the rotational speed and torque transmitted from the drive shaft 326 of the magnetic drive 304 to the output shaft 302 of the ice shaver. For example, the gear ratio of the gear assembly 306 can be adjusted to reduce the rotational speed, and thus increase the torque, transmitted from the drive shaft 326 to the output shaft 302. Conversely, the rotational speed transmitted by the gear assembly 306 can be increased, thereby reducing the torque transmitted, by adjusting the gear ratio of the gear assembly 306. The gear ratio can be adjusted by changing the number of gear teeth, the number of gears, and/or the size of gears of the gear assembly, as known in the art.

In the preferred embodiment of the ice shaver of the present invention, the desired speed of the output shaft 326 of the ice shaver is approximately 540 rpm for effective operation of the ice shaver. The magnetic drive 300 of the present invention, employing a brushless d.c. motor as is preferred, typically generates an operational speed of approximately 6000 rpm. Accordingly, the gear ratio of the gear assembly 306 is approximately 11.1:1.

One skilled in the art will readily appreciate that the magnetic drive and gear assembly of the present invention can be used in a wide variety of applications, in addition to the ice shaver described above, where it is desired to transmit power from a rotary output of a motor to a driven member under a load, including in other food processing equipment such as blenders, food mixers, food processors, and juicers.

Additionally, although the ice shaver of the present invention is described as a component of a combination blender/ice shaver machine, one skilled in the art will readily appreciate that the ice shaver can be a stand alone unit, i.e., the ice shaver can be independent of the blender.

Moreover, one skilled in the art will appreciate that the type and number of gears, the size of the gears, and the number of gear teeth of the gear assembly described herein in connection with the ice shaver of the present invention is exemplary only. These features, as well as other features of the gear assembly, can be varied to achieve the same, similar or, different gear ratios, as is desired for a specific application, without departing from the scope of the present invention. For example, design considerations, such as weight and size limitations, can dictate the number, type, and size of gears, as well as the number of gear teeth, employed to achieve the desired gear ratio.

These and other modifications and variations which will occur to those skilled in the art having read the foregoing specification in light of the accompanying drawings are intended to fall within the scope of the appended claims.

Figure 10:
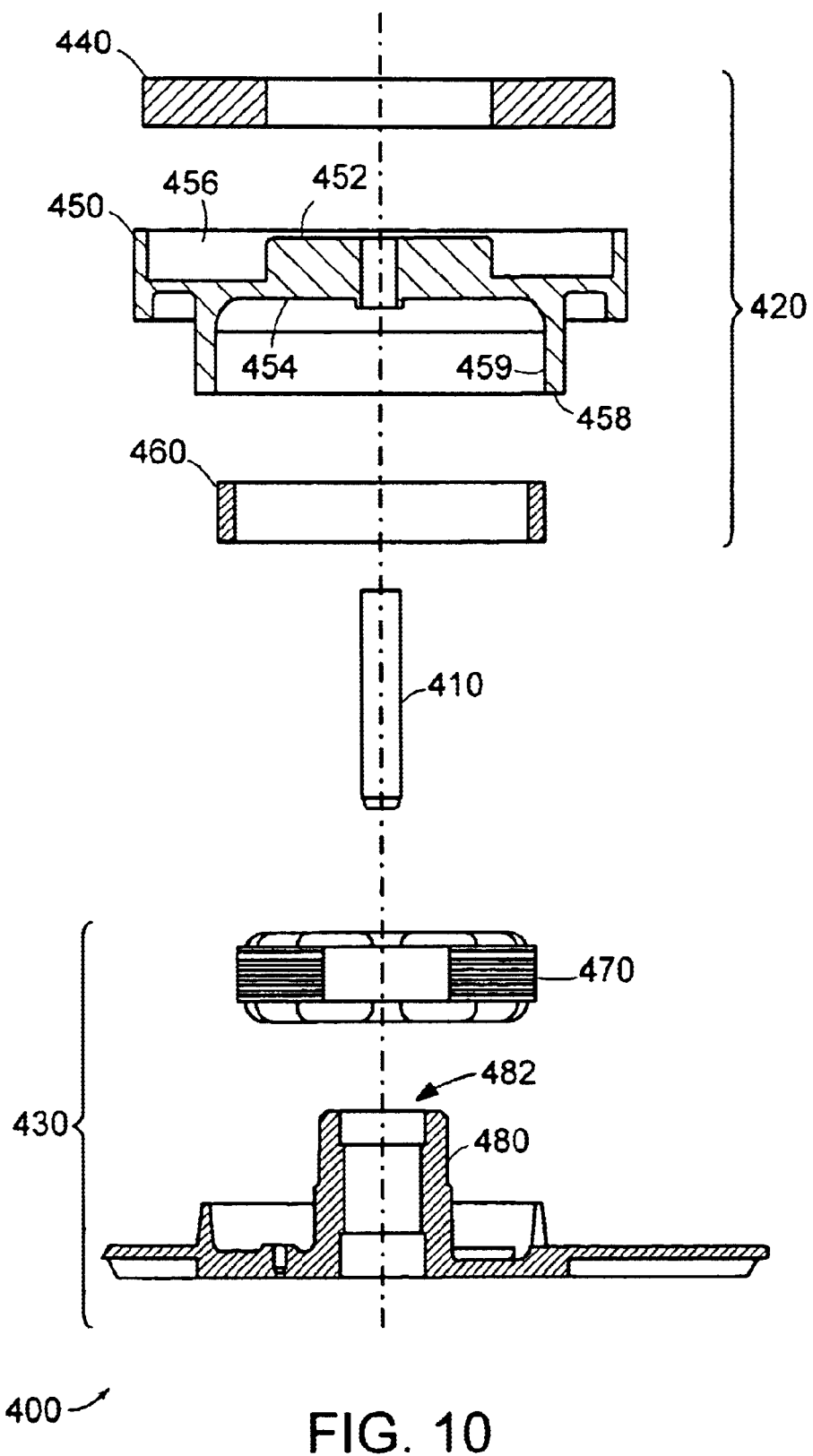
FIG. 10 is an exploded view in vertical section of an alternative embodiment of the motor of the present invention.

FIG. 10 is an exploded view in vertical section of an alternative embodiment of the motor of the present invention. As shown in FIG. 10, the motor 400 may include a motor shaft 410, a rotor 420 mounted on the motor shaft 410, and a stator 430 disposed about the motor shaft 410. The rotor 420 may include a drive magnet 440, a hub 450, and a rotor magnet 460. The stator 430 may include at least one stator coil 470 and a stator housing 480.

In one embodiment, the stator 430 may include at least one Hall effect sensor for determining the position of the rotor 420 according to schemes previously described herein.

As shown in FIG. 10, the drive magnet 440 and the rotor magnet 460 may include a first annular magnet and a second annular magnet, respectively. Alternately, the drive magnet 440 and/or the rotor magnet 460 may include multiple separate magnets disposed about the motor shaft 410. The multiple separate magnets may include arcuate-shaped magnets. In one embodiment, two or more of the magnets may be attached to each other by using an adhesive. The adhesive may include a glue, a conventional potting compound, or another type of adhesive. In one embodiment, the drive magnet 440 and/or the rotor magnet 460 may include a magnet at least partially constructed from a rare-earth-type material. For example, the drive magnet 440 and/or the rotor magnet 460 may include a magnet constructed at least partially from neodymium. Potentially advantageously, using magnets constructed from rare-earth materials may reduce a weight of the motor 400, which can lead to a reduction in heat, noise, and/or vibration during operation of the motor 400. The drive magnet 440 and/or the rotor magnet 460 may be substantially centered and/or substantially symmetric about the motor shaft 410.

Generally, the hub 450 may include a hub upper surface 452 facing away from the stator 430 and a hub lower surface 454 facing toward the stator 430. The hub 450 may be substantially centered and/or substantially symmetric about the motor shaft 410. The drive magnet 440 may be coupled to the hub upper surface 452, and the rotor magnet 460 may be coupled to the hub lower surface 454- The hub upper surface 452 may include a recess 456 for receiving the drive magnet 440. The recess 456 may be designed so that the hub upper surface 452 substantially encloses the drive magnet 440. Alternately, the recess 456 may be designed so that a portion of the drive magnet 440 extends upward from the hub upper surface 452. The hub lower surface 454 may include a sidewall 458 extending downward from the hub lower surface 454, and the rotor magnet 460 may be coupled to the sidewall 458. The sidewall 458 may include an inner surface 459 facing toward the motor shaft 410, and the rotor magnet 460 may be coupled to the inner surface 459.

A variety of different configurations of the rotor 420 are possible. For example, the hub upper surface 452 and/or the hub lower surface 454 may be substantially planar. Also, the hub upper surface 452 may include a sidewall extending upward from the hub upper surface, and the drive magnet 440 may be coupled to the sidewall in a manner similar to that previously described with respect to the rotor magnet 460. Additionally, the hub lower surface 454 may include a recess for receiving the rotor magnet 460 in a manner similar to that previously described with respect to the drive magnet 440.

The hub 450 may be formed from a metal or a magnetizable material. Alternately, the hub 450 may be formed from a plastic material.

The drive magnet 440 and the rotor magnet 460 may have multiple circumferentially arrayed poles. The drive magnet 440 and the rotor magnet 460 may be disposed so that their poles are aligned according to schemes previously described with respect to FIG. 6 and accompanying description.

The drive magnet 440 and the rotor magnet 460 may be coupled to the hub 450 so that the drive magnet 440, the rotor magnet 460, and the hub 450 rotate together about the motor shaft 410. The drive magnet 440 and the rotor magnet 460 may be coupled to the hub 450 by using a variety of conventional schemes. For example, the drive magnet 440 and/or the rotor magnet 460 may be removeably and replaceably attached to the hub 450 by using removeable and replaceable fasteners, such as clips, dowels, nails, nuts and bolts, screws, spikes, rivets, tacks, and/or other conventional mechanical fasteners. Alternately, the drive magnet 440 and/or the rotor magnet 460 may be press fit to the hub 450. Also alternately, the drive magnet 440 and/or the rotor magnet 460 may be attached to the hub 450 by using an adhesive, a braze, and/or a weld.

Figure 11:
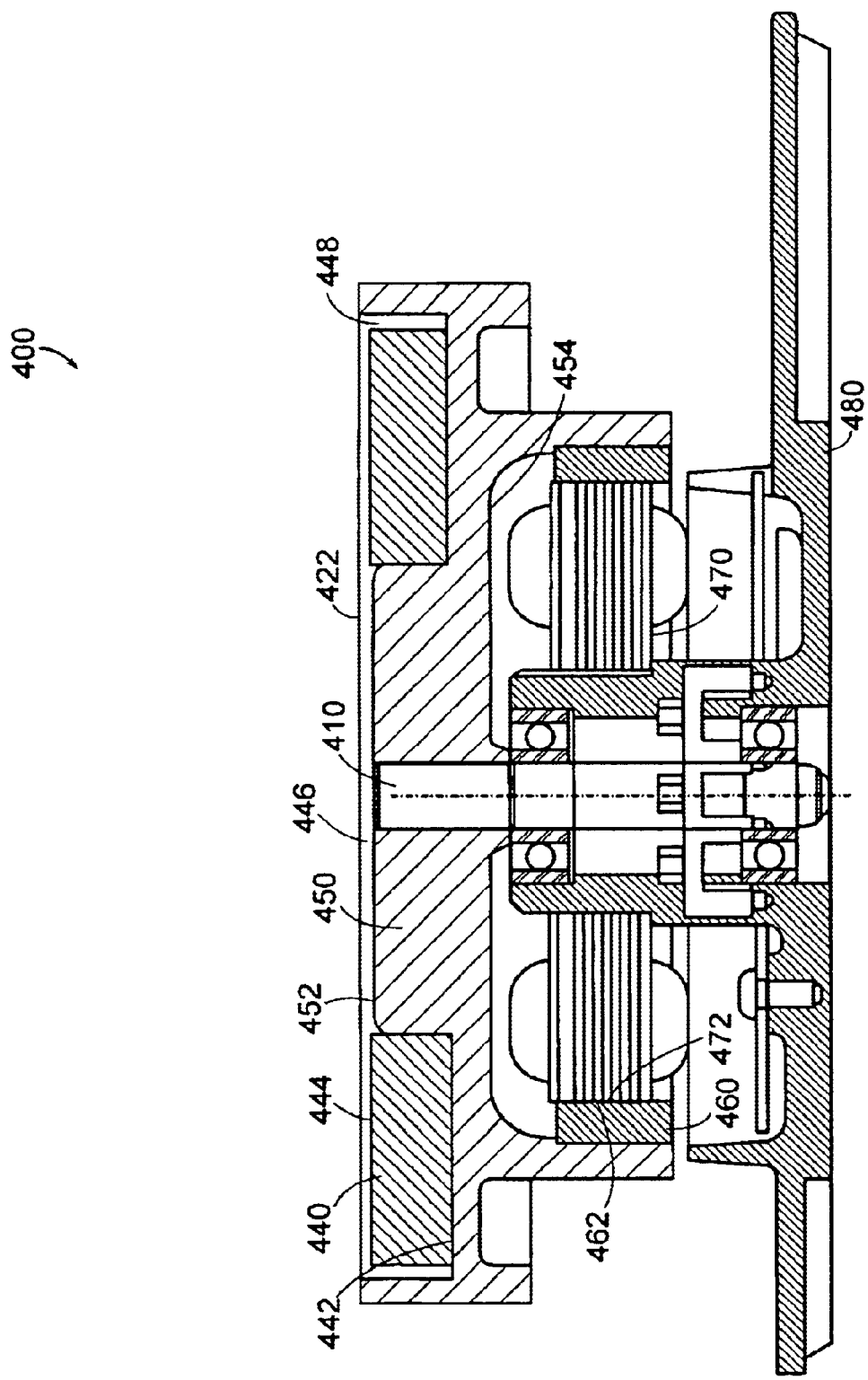
FIG. 11 is a view in vertical section of the embodiment of the motor shown in FIG. 10, illustrating an assembled motor.

FIG. 11 is a view in vertical section of the embodiment of the motor shown in FIG. 10, illustrating an assembled motor. The drive magnet 440 may be secured at a drive magnet lower surface 442 to the hub upper surface 452. Optionally, as shown in FIG. 11, the drive magnet 440 may also be secured at a drive magnet upper surface 444 to the hub upper surface 452. As previously described, the hub upper surface 452 may include a recess 456, and the recess 456 may substantially enclose the drive magnet 440. The recess 456 may be designed so that a first gap 446 occurs between the upward extent of the hub upper surface 452 and the upward extent of the attached drive magnet 440. The first gap 446 may be filled with an adhesive to further attach the drive magnet 440 to the hub 450 and provide a substantially planar upper rotor surface 422. In one embodiment, the first gap 446 may be filled with a conventional potting compound. The potting compound may be cured. After curing, excess potting compound may be removed to provide a substantially planar upper rotor surface 422. Potting compound may also be applied to fill in a second gap 448 between a transverse extent of the attached drive magnet 440 and a transverse extent of the recess 456. A similar scheme may be utilized to generate a substantially planar upper rotor surface 422 in embodiments in which a portion of the attached drive magnet 440 extends upward beyond the hub upper surface 452. For example, potting compound may be applied to the hub upper surface 452 to surround the portion of the drive magnet 440 extending upward from the hub upper surface 452.

As shown in FIG. 10, the stator 430 may include a conventional stator 430 having at least one stator coil 470. The stator coil 470 may be disposed on the stator housing 480, and the stator housing 480 may include a bore 482 for receiving the motor shaft 410. The stator 430 and, in particular, the at least one stator coil 470 may be substantially centered about the motor shaft 410. Generally, the stator 430 may be assembled by using schemes similar to those previously described with respect to FIGS. 3, 4, and 7-9 and accompanying description.

As shown in FIG. 11, the motor shaft 410 may be journalled in the bore 482 of the stator housing 480 and the rotor 420 may be rotatably mounted on the motor shaft 410 by using schemes similar to those previously described. The at least one stator coil 470 may include an outer stator surface 472 facing away from the motor shaft 410, and the rotor magnet 460 may include an inner rotor magnet surface 462 facing toward the motor shaft 410. Generally, the motor 400 may be assembled so that the inner rotor magnet surface 462 at least partially faces the outer stator surface 472. The configuration of the motor 400 provides an alternative to the configurations of the motors 28 and 310 shown in FIGS. 4 and 8, respectively.

As previously indicated, in one embodiment, the rotor magnet 460 may include multiple rotor magnets disposed about the motor shaft 410. In such an embodiment, at least one of the multiple rotor magnets 460 may include an inner rotor magnet surface 462 that at least partially faces the outer stator surface 472.

A variety of different configurations of the motor 400 are possible. For example, the rotor magnet 460 may be disposed within the at least one stator coil 470. In such an embodiment, the rotor magnet 460 may include an outer rotor magnet surface facing away from the motor shaft 410, and the at least one stator coil 470 may include an inner stator surface facing toward the motor shaft 410. The motor 400 may then be assembled so that the inner stator surface at least partially faces the outer rotor magnet surface.

Figure 12:
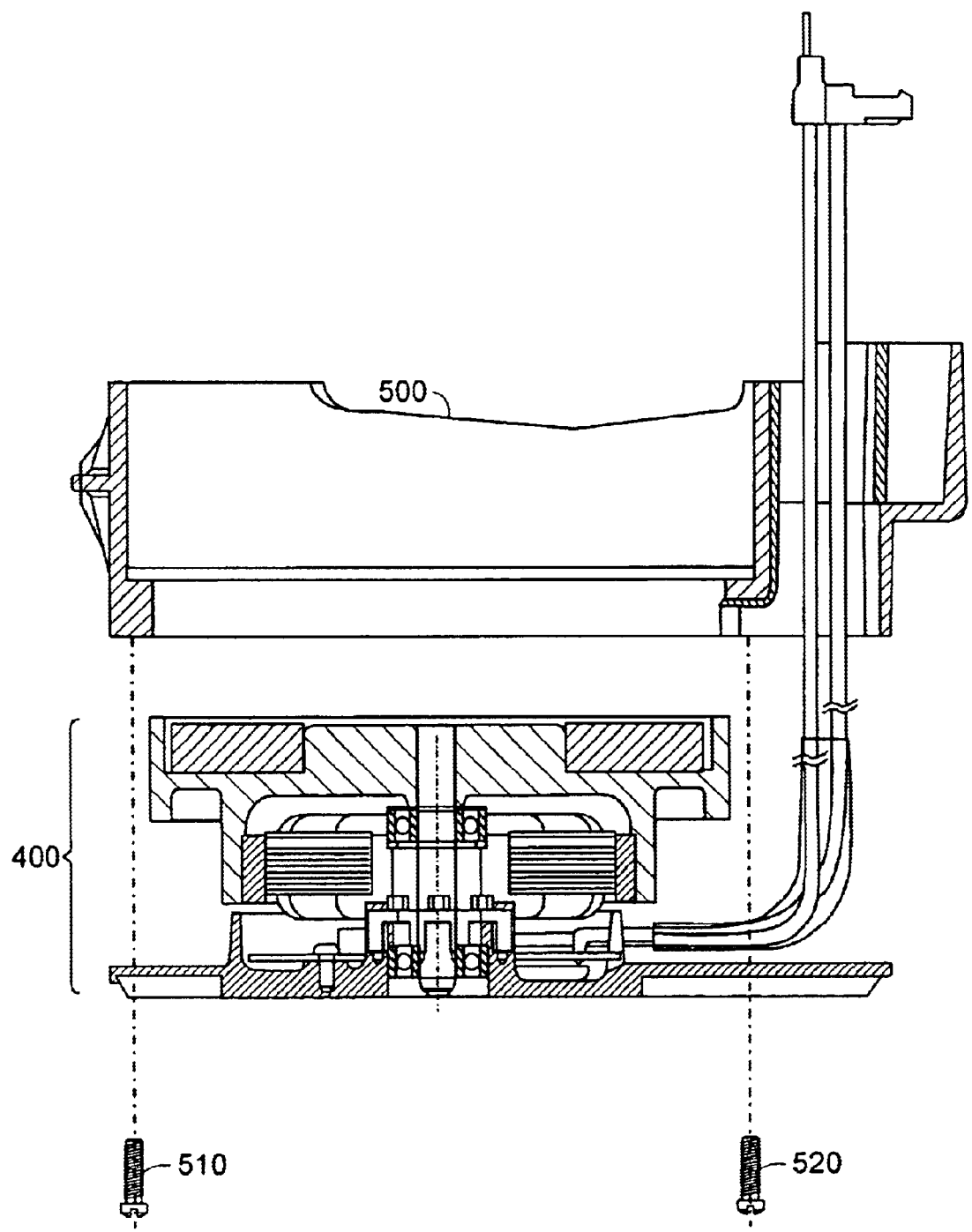
FIG. 12 is an exploded view in vertical section of the motor shown in FIG. 10, illustrating a motor base.

FIG. 12 is an exploded view in vertical section of the motor shown in FIG. 10, illustrating a motor base. The motor 400 may be coupled to the motor base 500 by using conventional mechanical fasteners, e.g. screws 510, 520. Generally, the motor 400 may be coupled to the food processing apparati and magnetic drives previously described with respect to FIGS. 1–9 and accompanying description. For example, the motor 400 may generate a torque for transmission to a drive plate in a food processing apparatus. In such an embodiment, the drive magnet 440 may be magnetically coupled to the drive plate, and the stator 430 may be energized to produce an electromagnetic field that interacts with the rotor magnet 460 to rotate the rotor magnet 460. The drive magnet 440 may rotate with the rotor magnet 460 and may induce a magnetic field in a direction toward the drive plate to transmit torque from the motor 400 to the drive plate.

Figure 13A:
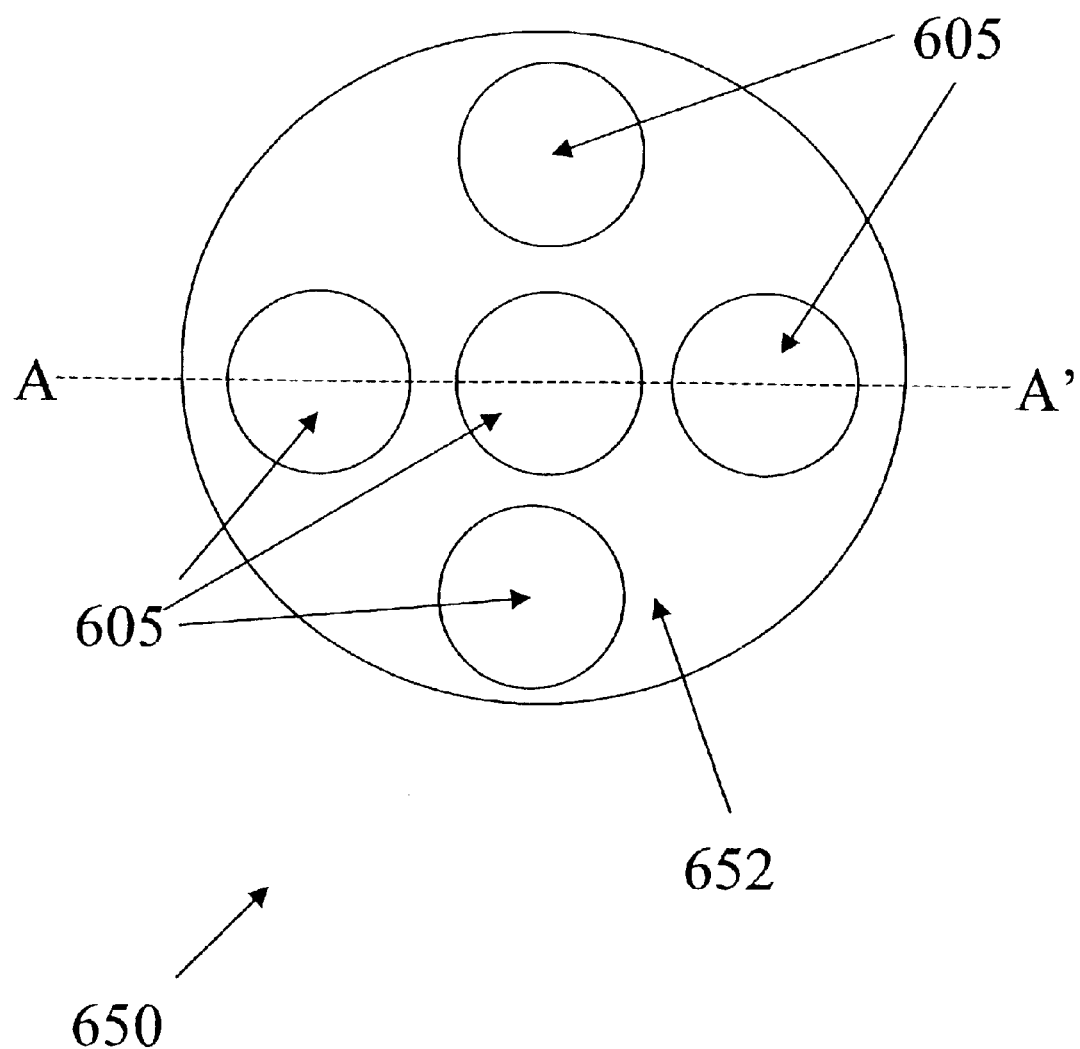
FIG. 13A is a top view of an alternative embodiment of the hub shown in FIGS. 10–12.
Figure 13B:
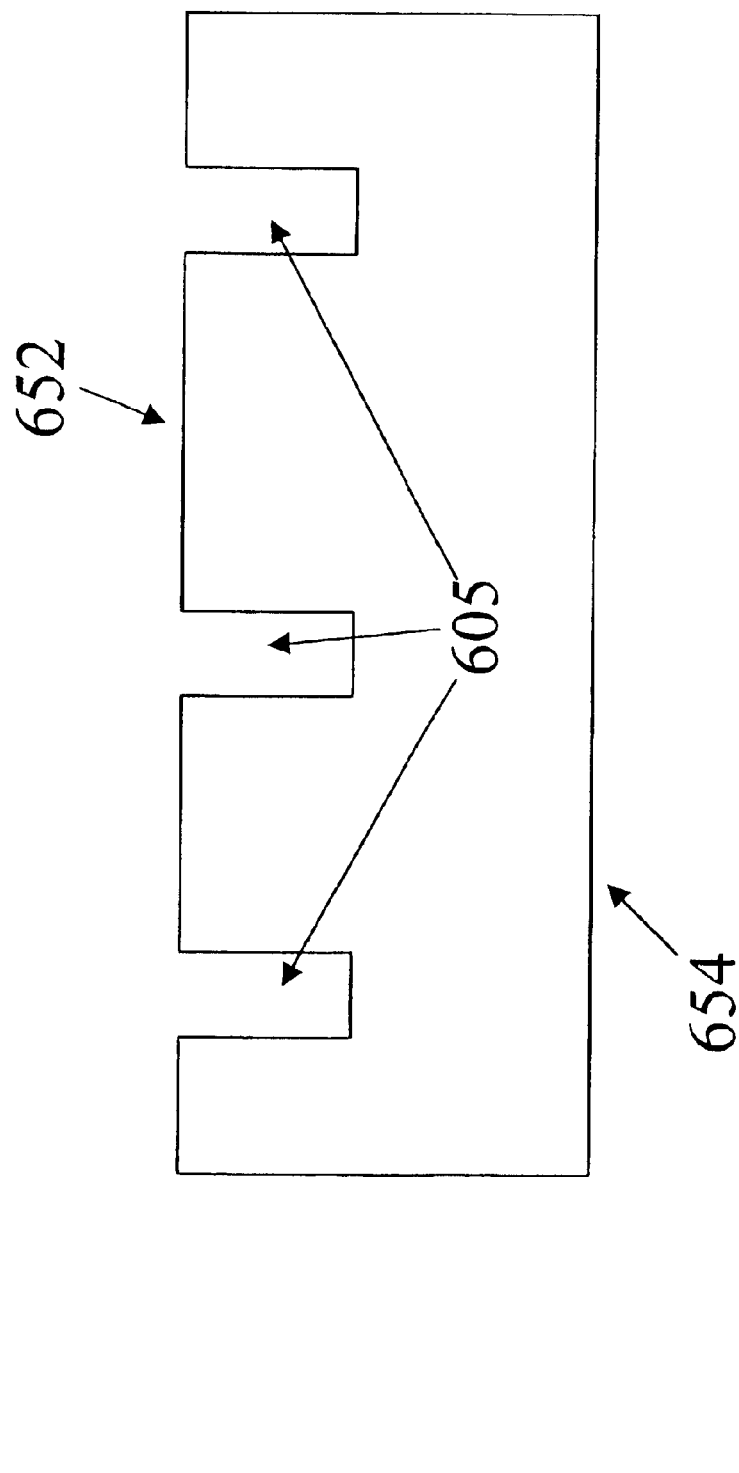
FIG. 13B is a view in vertical cross-section along line A—A' of FIG. 13A of the hub shown in FIG. 13A; and, FIG. 14 is a diagram of an embodiment of a system for controlling a motor of the present invention.

FIGS. 13A and 13B are views of an alternative embodiment of the hub of the motor 400 shown in FIGS. 10–12. As shown in FIGS. 13A and 13B, in one embodiment, the huh 650 may include multiple channels 605 extending downward from a hub upper surface 652 towards a hub lower surface 654. The channels 605 may be formed in the hub upper surface 652 according to conventional schemes. For example, the channels 605 may be drilled in the hub upper surface 652. The channels 605 may have a variety of different shapes and may be disposed at a variety of locations on the hub upper surface 652. In one embodiment, the drive magnet 440 may include multiple separate magnets sized and shaped to be disposed in the channels 605. The multiple separate magnets may be disposed in the channels according to previously described schemes. As previously indicated, the multiple magnets may be at least partially constructed from a rare-earth material. Potentially advantageously, such an embodiment may reduce a weight of the motor 400, which can lead to a reduction in heat, noise, and/or vibration during operation of the motor 400.

Figure 14:
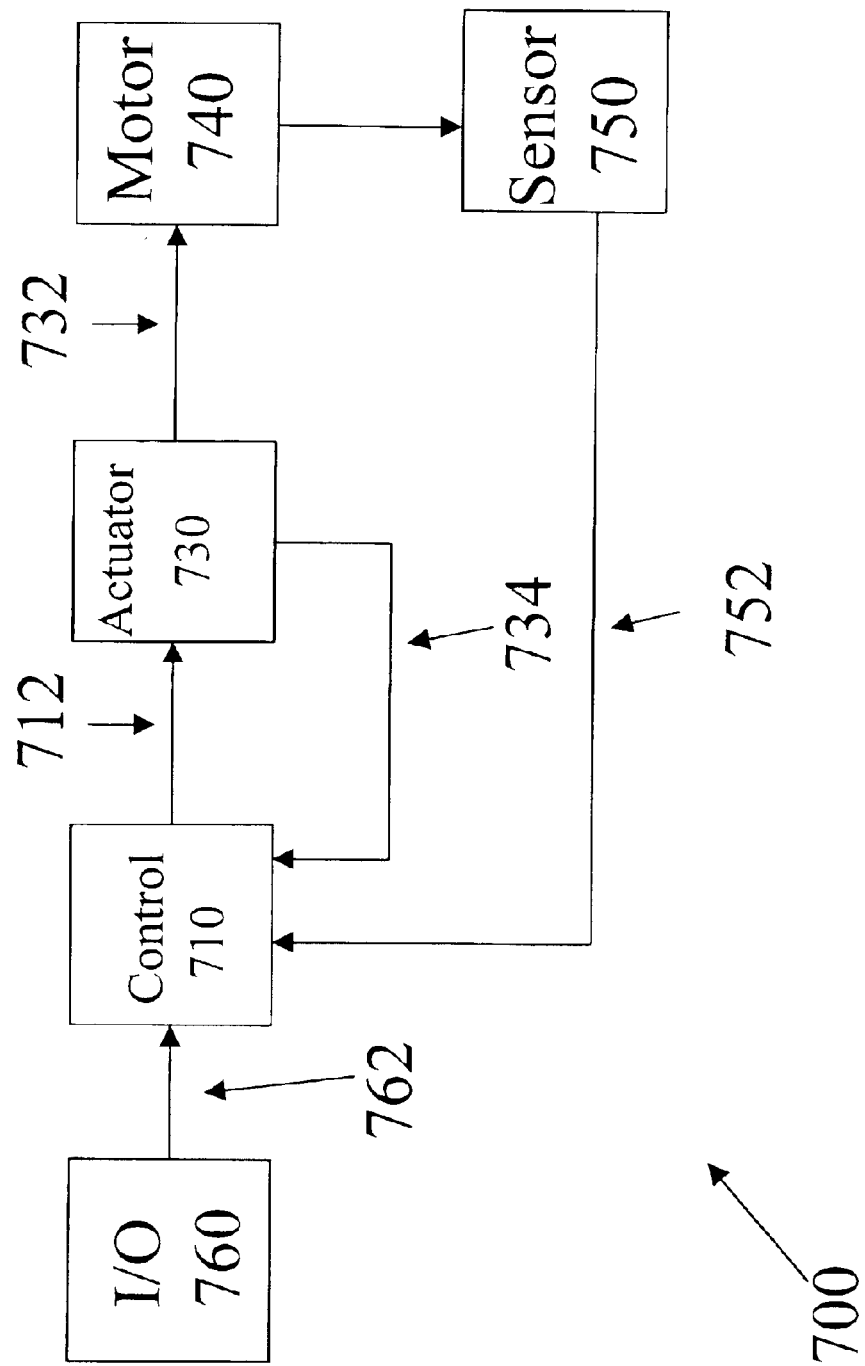

FIG. 14 is a diagram of an embodiment of a system for controlling a motor of the present invention. As shown in FIG. 14, the system 700 may include a control unit 710, an actuator 730, a motor 740, a sensor 750, and an input/output device 760. Generally, control unit 710 may control a current and/or a voltage provided to motor 740 based on an input signal 762 from input/output device 760 and/or a signal from sensor 750.

As shown in FIG. 14, motor 740 may be connected to a sensor 750 that can measure a back electromotive force (back EMF) generated by motor 740. The sensor 750 and/or the control unit 710 may determine a speed and/or a position of the rotor of the motor 740 based on the measured back EMF. As will be understood by those of ordinary skill in the art, a speed of the rotor may be determined based on a magnitude of the back EMF, and a position of the rotor may be based on a location of zero-crossing(s) of the back EMF. The sensor 750 may provide a signal 752 including the measured back EMF and/or other data, such as a position and/or a speed of the rotor, to control unit 710.

As shown in FIG. 14, control unit 710 may receive a signal 762 from an input/output device 760. Input/output device 760 may include an interface for interacting with a user. In one embodiment, input/output device 760 may communicate operating parameter(s) of the motor 740 between control unit 710 and a user. For example, input/output device 760 may communicate a user-desired operating speed of the motor 740 to control unit 710. Also, input/output device 760 may communicate an actual operating speed of motor 740 to a user.

As shown in FIG. 14, control unit 710 may provide a control signal 712 to an actuator 730. Actuator 730 may generate an actuating or driving signal 732 for motor 740 based on the control signal 712 from control unit 710. In one embodiment, actuator 730 may include an amplifier. For example, actuator 730 may include an inverting operational amplifier.

As shown in FIG. 14, actuator 730 may provide a feedback signal 734 to control unit 710. In one embodiment, feedback signal 734 may be based on a current provided to motor 740, and control unit 710 may monitor feedback signal 734. Control unit 710 may adjust the current provided to motor 740 based on feedback signal 734, i.e. based on the current provided to motor 740. In one embodiment, control unit 710 may be designed to adjust the current provided to the motor 740 based on feedback signal 734 exceeding a pre-determined value. For example, control unit 710 may be designed to reduce the current provided to motor 740 based on the feedback signal 734 exceeding a pre-determined value associated with safe operation of motor 740.

Control unit 710 may include at least one application-specific processor (ASP) familiar to those of ordinary skill in the art. In one embodiment, control unit 710 may include a digital signal processor (DSP), and the DSP may include at least one analog-to-digital converter (ADC) and/or other operating component(s) familiar to those of ordinary skill in the art.

An exemplary operation of control system 700 may be understood in the following manner. Based on data 762 received from input/output device 760, control unit 710 may determine an operating parameter for motor 740. For example, control unit 710 may determine an operating speed of a rotor of the motor 740. Control unit 710 may provide a corresponding control signal 712 to actuator 730, and, based on the control signal 712, actuator 730 may provide an actuating signal 732 to motor 740 sufficient to actuate motor 740 to the desired operating parameter. Control unit 710 may monitor the operating parameter measured by sensor 750, and may adjust the control signal 712 provided to actuator 730 based on a difference between a desired operating parameter and the measured operating parameter. Control unit 710 may also monitor the feedback signal 734 provided by actuator 730.

Generally, control system 700 may control a current provided to motor 740 and/or to a component associated with motor 740, such as a component previously described herein, e.g. a blender, a food processor, and an ice shaver. For example, control system 700 may control a current provided to a blender and/or an ice shaver connected to the blender. Control system 700 may control a speed of the motor 740 and/or a speed of a component associated with the motor 400. Control system 700 may be designed to control motors similar to those previously described herein, including brushless motors and 3-phase brushless motors.

While the food processing apparati and magnetic drives disclosed herein have been particularly shown and described with reference to the exemplary embodiments thereof, those of ordinary skill in the art will understand that various changes may be made in the form and details herein without departing from the spirit and scope of the disclosure. Those of ordinary skill in the art will recognize or be able to ascertain many equivalents to the exemplary embodiments described specifically herein by using no more than routine experimentation. Such equivalents are intended to be encompassed by the scope of the present disclosure and the appended claims.

What is claimed is:

1. A food processing apparatus comprising:
   a drive shaft,
   a receptacle for receiving food for processing, the receptacle including a rotatable element coupled to the drive shaft,
   a drive plate formed of magnetizable material, the drive plate coupled to the drive shaft to rotate therewith,
   a motor positioned proximate the drive plate, the motor including
      a motor shaft,
      a rotor rotatably mounted on the motor shaft, the rotor having a rotor magnet, the rotor magnet including an inner rotor magnet surface facing toward the motor shaft, and
      a stator producing an electromagnetic field that interacts with the rotor magnet to rotate the rotor magnet, the stator including an outer stator surface facing away from the motor shaft,
      wherein the inner rotor magnet surface at least partially faces the outer stator surface, and
   a drive magnet coupled to the rotor magnet to rotate therewith, the drive magnet inducing a magnetic field in a direction toward the drive plate to transmit torque from the motor to the drive plate to effect processing of food with the rotatable element.

2. The food processing apparatus of claim 1, wherein the food processing apparatus includes one of a blender, a food mixer, a food processor, and a juicer.

3. The food processing apparatus of claim 2, wherein
   the food processing apparatus includes a blender,
   the receptacle includes a blender cup, and
   the rotatable element includes a blade.

4. The food processing apparatus of claim 1, wherein the rotor magnet includes an annular magnet.

5. The food processing apparatus of claim 1, wherein the rotor magnet includes multiple magnets and at least one of the multiple magnets includes an inner surface facing toward the motor shaft.

6. The food processing apparatus of claim 1, wherein the rotor magnet and the stator are substantially centered about the motor shaft.

7. The food processing apparatus of claim 1, further comprising
   a hub formed of plastic material rotatably mounted on the motor shaft, the drive magnet and the rotor magnet being coupled to the hub.

8. The food processing apparatus of claim 7, wherein the hub includes
   a hub upper surface facing away from the stator, the drive magnet being secured to the hub upper surface, and
   a hub lower surface facing toward the stator, the rotor magnet being secured to the hub lower surface.

9. The food processing apparatus of claim 8, wherein the hub upper surface includes
   a recess for receiving the drive magnet.

10. The food processing apparatus of claim 8, wherein the hub lower surface includes
    a lower sidewall extending downward from the hub lower surface, the rotor magnet being secured to the lower sidewall.

11. The food processing apparatus of claim 10, wherein the lower sidewall includes
    an inner surface facing towards the motor shaft, the rotor magnet being secured to the inner surface.

12. A drive for a driven member, the drive comprising:
    a drive plate,
    a motor positioned proximate the drive plate, the motor including
       a shaft,
       a rotor rotatably mounted on the shaft, the rotor having a rotor magnet, the rotor magnet including an inner rotor magnet surface facing toward the shaft, and
       a stator producing an electromagnetic field that interacts with the rotor magnet to rotate the rotor magnet, the stator including an outer stator surface facing away from the shaft,
       wherein the inner rotor magnet surface at least partially faces the outer stator surface, and
    a drive magnet magnetically coupled to the drive plate and magnetically coupled to the rotor magnet, the drive magnet transmitting a torque from the motor to the drive plate.

13. The drive of claim 12, wherein the rotor magnet includes an annular magnet.

14. The drive of claim 12, wherein the rotor magnet includes multiple magnets, and at least one of the multiple magnets includes an inner surface facing toward the motor shaft.

15. The drive of claim 12, wherein the rotor magnet and the stator are substantially centered about the shaft.

16. The drive of claim 12, further comprising
    a hub formed of plastic material rotatably mounted on the shaft, the drive magnet and the rotor magnet being coupled to the hub.

17. The drive of claim 16, wherein the hub includes
    a hub upper surface facing away from the stator, the drive magnet being coupled to the hub upper surface, and
    a hub lower surface facing toward the stator, the rotor magnet being coupled to the hub lower surface.

18. The drive of claim 17, wherein the hub upper surfaces includes
    a recess for receiving the drive magnet.

19. The drive of claim 17, wherein the hub lower surface includes
    a lower sidewall extending downward from the hub lower surface, the rotor magnet being secured to the lower sidewall.

20. The drive of claim 19, wherein the lower sidewall includes
    an inner surface facing towards the shaft, the rotor magnet being secured to the inner surface.

21. A drive for a driven member, the drive comprising:
    a drive plate,
    a motor positioned proximate the drive plate, the motor including a shaft, a rotor rotatably mounted on the shaft, the rotor having a rotor magnet, the rotor magnet including an inner rotor magnet surface facing toward the shaft, and a stator producing an electromagnetic field that interacts with the rotor magnet to rotate the rotor magnet, the stator including an outer stator surface facing away from the shaft, wherein the inner rotor magnet surface at least partially faces the outer stator surface, a drive magnet magnetically coupled to the drive plate and magnetically coupled to the rotor magnet, the drive magnet transmitting a torque from the motor to the drive plate, and a hub formed of plastic material rotatably mounted on the shaft, the drive magnet and the rotor magnet being coupled to opposite surfaces of the hub.

22. The drive of claim 21, wherein the rotor magnet includes an annular magnet.

23. The drive of claim 21, wherein the rotor magnet includes multiple magnets, and at least one of the multiple magnets includes an inner surface facing toward the motor shaft.

24. The drive of claim 21, wherein the rotor magnet and the stator are substantially centered about the shaft.

25. The drive of claim 21, wherein the hub includes a hub upper surface facing away from the stator, the drive magnet being secured to the hub upper surface, and a hub lower surface facing toward the stator, the rotor magnet being secured to the hub lower surface.

26. The drive of claim 25, wherein the hub upper surface includes a recess for receiving the drive magnet.

27. The drive of claim 25, wherein the hub lower surface includes a lower sidewall extending downward from the hub lower surface, the rotor magnet being secured to the lower sidewall.

28. The drive of claim 25, wherein the lower sidewall includes an inner surface facing towards the motor shaft, the rotor magnet being secured to the inner surface.

* * * * *

UNITED STATES PATENT AND TRADEMARK OFFICE
CERTIFICATE OF CORRECTION

PATENT NO.   : 6,793,167 B2
DATED        : September 21, 2004
INVENTOR(S)  : John F. Karkos, Jr. et al.

It is certified that error appears in the above-identified patent and that said Letters Patent is hereby corrected as shown below:

Title page,
Item [*] Notice, delete "[*] Notice: This patent issued on a continued prosecution application filed under 37 CFR 1.53(d), and is subject to the twenty year patent term provisions of 35 USC 1.54(a)(2). --; and change "0 days" to -- 44 days --.

Signed and Sealed this

Fifth Day of July, 2005

JON W. DUDAS
*Director of the United States Patent and Trademark Office*